(12) United States Patent
Dalum

(10) Patent No.: US 12,330,657 B2
(45) Date of Patent: Jun. 17, 2025

(54) HYBRID VEHICLE DRIVE SYSTEM AND METHOD FOR FUEL REDUCTION DURING IDLE

(71) Applicant: Power Technology Holdings LLC, Pewaukee, WI (US)

(72) Inventor: Joseph T. Dalum, Delafield, WI (US)

(73) Assignee: Power Technology Holdings LLC, Pewaukee, WI (US)

( * ) Notice: Subject to any disclaimer, the term of this patent is extended or adjusted under 35 U.S.C. 154(b) by 515 days.

(21) Appl. No.: 17/572,435

(22) Filed: Jan. 10, 2022

(65) Prior Publication Data

US 2022/0153138 A1  May 19, 2022

Related U.S. Application Data

(63) Continuation-in-part of application No. 15/588,532, filed on May 5, 2017, now Pat. No. 11,225,240, and
(Continued)

(51) Int. Cl.
*B60K 17/28* (2006.01)
*B60K 25/06* (2006.01)
(Continued)

(52) U.S. Cl.
CPC ......... *B60W 30/1888* (2013.01); *B60K 25/06* (2013.01); *B60L 58/12* (2019.02);
(Continued)

(58) Field of Classification Search
CPC .......... B60K 6/48; B60K 17/28; B60K 25/06; B60W 10/06; B60W 10/08;
(Continued)

(56) References Cited

U.S. PATENT DOCUMENTS 2,581,010 A   1/1952  Findley et al.
2,968,915 A   1/1961  Feistel, Jr.
(Continued)

FOREIGN PATENT DOCUMENTS

CN   1647968   8/2005
CN   101011964  8/2007
(Continued)

OTHER PUBLICATIONS

International Search Report and Written Opinion regarding Int'l. Appl. No. PCT/US2021/063367, mail date Apr. 18, 2022, 12 pps.
(Continued)

*Primary Examiner* — Gonzalo Laguarda
(74) *Attorney, Agent, or Firm* — Foley & Lardner LLP

(57) ABSTRACT

A vehicle drive system for a vehicle including a first prime mover, a first prime mover driven transmission, and a rechargeable power source can be configured for reduced fuel consumption at idle. The vehicle drive system includes an electric motor in direct or indirect mechanical communication with the first prime mover. The control system causes fuel to be eliminated to the first prime mover while the vehicle is stopped and causes the electric motor to rotate the first prime mover at a speed, thereby reducing fuel consumption at idle for the vehicle.

20 Claims, 8 Drawing Sheets

Related U.S. Application Data a continuation-in-part of application No. 15/067,419, filed on Mar. 11, 2016, now Pat. No. 10,071,647, said application No. 15/588,532 is a continuation of application No. 14/745,232, filed on Jun. 19, 2015, now Pat. No. 9,643,593, which is a continuation of application No. 14/081,892, filed on Nov. 15, 2013, now Pat. No. 9,061,680, which is a continuation-in-part of application No. PCT/US2013/036431, filed on Apr. 12, 2013, said application No. 15/067,419 is a continuation of application No. 13/812,723, filed as application No. PCT/US2012/029835 on Mar. 20, 2012, now Pat. No. 9,283,954.

(60) Provisional application No. 61/624,118, filed on Apr. 13, 2012, provisional application No. 61/566,526, filed on Dec. 2, 2011.

(51) Int. Cl.
 *B60L 58/12* (2019.01)
 *B60W 10/06* (2006.01)
 *B60W 10/08* (2006.01)
 *B60W 20/15* (2016.01)
 *B60W 20/16* (2016.01)
 *B60W 30/18* (2012.01)
 *B60W 30/188* (2012.01)
 *B60K 25/00* (2006.01)

(52) U.S. Cl.
 CPC ............ *B60W 10/06* (2013.01); *B60W 10/08* (2013.01); *B60W 20/15* (2016.01); *B60W 20/16* (2016.01); *B60W 30/18054* (2013.01); *B60K 2025/005* (2013.01); *B60W 2510/244* (2013.01); *B60W 2510/305* (2013.01); *B60W 2520/04* (2013.01); *B60W 2710/0666* (2013.01); *B60W 2710/0694* (2013.01); *B60W 2710/083* (2013.01); *B60Y 2200/41* (2013.01)

(58) Field of Classification Search
 CPC ....... B60W 30/1888; B60W 30/18054; B60W 20/15; B60W 20/16; B60L 50/16; B60L 58/12
 See application file for complete search history.

(56) References Cited

U.S. PATENT DOCUMENTS

| | | |
|---|---|---|
| 3,299,983 A | 1/1967 | Hubbard |
| 3,493,066 A | 2/1970 | Dooley |
| 3,923,115 A | 12/1975 | Helling |
| 4,443,752 A | 4/1984 | Newman |
| 4,588,040 A | 5/1986 | Albright et al. |
| 4,671,577 A | 6/1987 | Woods |
| 4,676,116 A | 6/1987 | Nerstad et al. |
| 4,918,690 A | 4/1990 | Markkula et al. |
| 4,941,143 A | 7/1990 | Twitty et al. |
| 4,948,050 A | 8/1990 | Picot |
| 4,955,018 A | 9/1990 | Twitty et al. |
| 4,959,962 A | 10/1990 | Hagin et al. |
| 4,962,462 A | 10/1990 | Fekete |
| 4,969,147 A | 11/1990 | Markkula et al. |
| 4,993,780 A | 2/1991 | Tanaka et al. |
| 5,190,118 A | 3/1993 | Yelton |
| 5,195,600 A | 3/1993 | Dorgan |
| 5,242,278 A | 9/1993 | Vanderslice et al. |
| 5,297,143 A | 3/1994 | Fridrich et al. |
| 5,315,227 A | 5/1994 | Pierson et al. |
| 5,318,142 A | 6/1994 | Bates et al. |
| 5,319,641 A | 6/1994 | Fridrich et al. |
| 5,366,827 A | 11/1994 | Belanger et al. |
| 5,373,198 A | 12/1994 | Lopez Jimenez |
| 5,394,089 A | 2/1995 | Clegg |
| 5,420,572 A | 5/1995 | Dolin et al. |
| 5,492,189 A | 2/1996 | Kriegler et al. |
| 5,495,912 A | 3/1996 | Gray et al. |
| 5,500,852 A | 3/1996 | Riley |
| 5,513,324 A | 4/1996 | Dolin et al. |
| 5,519,878 A | 5/1996 | Dolin, Jr. |
| 5,558,588 A | 9/1996 | Schmidt |
| 5,568,037 A | 10/1996 | Massaroni et al. |
| 5,569,552 A | 10/1996 | Rao et al. |
| 5,620,057 A | 4/1997 | Klemen et al. |
| 5,625,272 A | 4/1997 | Takahashi |
| 5,635,805 A | 6/1997 | Ibaraki et al. |
| 5,669,842 A | 9/1997 | Schmidt |
| 5,701,068 A | 12/1997 | Baer et al. |
| 5,806,617 A | 9/1998 | Yamaguchi |
| 5,833,570 A | 11/1998 | Tabata et al. |
| 5,866,276 A | 2/1999 | Ogami et al. |
| 5,867,009 A | 2/1999 | Kiuchi et al. |
| 5,887,674 A | 3/1999 | Gray, Jr. |
| 5,892,346 A | 4/1999 | Moroto et al. |
| 5,923,093 A | 7/1999 | Tabata et al. |
| 5,934,396 A | 8/1999 | Kurita |
| 5,985,483 A | 11/1999 | Verhoog et al. |
| 6,022,292 A | 2/2000 | Goodnight |
| 6,037,749 A | 3/2000 | Parsonage |
| 6,042,961 A | 3/2000 | Verhoog et al. |
| 6,048,288 A | 4/2000 | Tsujii et al. |
| 6,057,050 A | 5/2000 | Parise |
| 6,165,102 A | 12/2000 | Bellinger |
| 6,179,395 B1 | 1/2001 | Schneider |
| 6,198,387 B1 | 3/2001 | Dalum et al. |
| 6,220,733 B1 | 4/2001 | Gordon |
| 6,251,042 B1 | 6/2001 | Peterson et al. |
| 6,269,895 B1 | 8/2001 | Tanuguchi et al. |
| 6,316,841 B1 | 11/2001 | Weber |
| 6,386,303 B1 | 5/2002 | Zibuschka et al. |
| 6,395,417 B1 | 5/2002 | Frazier |
| 6,456,041 B1 | 9/2002 | Terada et al. |
| 6,484,830 B1 | 11/2002 | Gruenwald et al. |
| 6,502,393 B1 | 1/2003 | Stephenson et al. |
| 6,511,399 B2 | 1/2003 | Mc Collum Etchason et al. |
| 6,518,732 B2 | 2/2003 | Palanisamy |
| 6,524,084 B2 | 2/2003 | Neumair |
| 6,524,743 B2 | 2/2003 | Vackar |
| 6,579,642 B2 | 6/2003 | Yamane et al. |
| 6,590,363 B2 | 7/2003 | Teramoto |
| 6,598,496 B2 | 7/2003 | Pannell |
| 6,617,826 B2 | 9/2003 | Liao et al. |
| 6,651,759 B1 | 11/2003 | Gruenwald et al. |
| 6,653,002 B1 | 11/2003 | Parise |
| 6,658,852 B2 | 12/2003 | Frey |
| 6,666,022 B1 | 12/2003 | Yoshimatsu et al. |
| 6,672,415 B1 | 1/2004 | Tabata |
| 6,692,395 B2 | 2/2004 | Rodeghiero et al. |
| 6,705,416 B1 | 3/2004 | Glonner et al. |
| 6,708,787 B2 | 3/2004 | Naruse et al. |
| 6,718,782 B2 | 4/2004 | Egami |
| 6,719,080 B1 | 4/2004 | Gray, Jr. |
| 6,724,165 B2 | 4/2004 | Hughes |
| 6,725,581 B2 | 4/2004 | Naruse et al. |
| 6,751,960 B2 | 6/2004 | Arimitsu |
| 6,798,165 B2 | 9/2004 | Cartwright et al. |
| 6,834,737 B2 | 12/2004 | Bloxham |
| 6,880,651 B2 | 4/2005 | Loh et al. |
| 6,882,129 B2 | 4/2005 | Boskovitch et al. |
| 6,885,920 B2 | 4/2005 | Yakes et al. |
| 6,907,948 B2 | 6/2005 | Wakashiro et al. |
| 6,922,990 B2 | 8/2005 | Naruse et al. |
| 6,945,039 B2 | 9/2005 | Yoshino |
| 6,945,893 B2 | 9/2005 | Grillo et al. |
| 6,962,093 B2 | 11/2005 | Warner |
| 6,969,921 B2 | 11/2005 | Yoshimatsu |
| 7,004,273 B1 | 2/2006 | Gruenwald et al. |
| 7,017,348 B2 | 3/2006 | Tajima et al. |
| 7,086,226 B2 | 8/2006 | Oguri |
| 7,093,912 B2 | 8/2006 | Brown et al. |
| 7,096,985 B2 | 8/2006 | Charaudeau et al. |
| 7,100,719 B2 | 9/2006 | Yamaguchi |

(56) References Cited

U.S. PATENT DOCUMENTS

| | | |
|---|---|---|
| 7,104,920 B2 | 9/2006 | Beaty et al. |
| 7,119,454 B1 | 10/2006 | Chiao |
| 7,125,357 B2 | 10/2006 | Porter |
| 7,146,960 B2 | 12/2006 | Phlips et al. |
| 7,147,071 B2 | 12/2006 | Gering et al. |
| 7,182,583 B2 | 2/2007 | Gandrud et al. |
| 7,185,722 B1 | 3/2007 | Sakamoto et al. |
| 7,190,133 B2 | 3/2007 | King et al. |
| 7,207,404 B2 | 4/2007 | Ito et al. |
| 7,207,916 B2 | 4/2007 | Rodeghiero et al. |
| 7,219,000 B2 | 5/2007 | Steinmetz et al. |
| 7,251,265 B2 | 7/2007 | Yakymyshyn et al. |
| 7,252,165 B1 | 8/2007 | Gruenwald et al. |
| 7,258,183 B2 | 8/2007 | Leonardi et al. |
| 7,273,122 B2 | 9/2007 | Rose |
| 7,275,917 B1 | 10/2007 | Hicks |
| 7,277,782 B2 | 10/2007 | Yakes et al. |
| 7,281,770 B1 | 10/2007 | Curran et al. |
| 7,293,621 B2 | 11/2007 | Long |
| 7,298,102 B2 | 11/2007 | Sopko et al. |
| 7,315,090 B2 | 1/2008 | Yang |
| 7,343,897 B2 | 3/2008 | Katrak et al. |
| 7,345,441 B2 | 3/2008 | Yoshimatsu |
| 7,375,492 B2 | 5/2008 | Calhoon et al. |
| 7,391,129 B2 | 6/2008 | Chiao et al. |
| 7,399,255 B1 | 7/2008 | Johnson et al. |
| 7,427,156 B2 | 9/2008 | Ambrosio et al. |
| 7,448,981 B2 | 11/2008 | Mashiki |
| 7,471,066 B2 | 12/2008 | Ambrosio et al. |
| 7,487,023 B2 | 2/2009 | Komiyama et al. |
| 7,520,354 B2 | 4/2009 | Morrow et al. |
| 7,575,287 B2 | 8/2009 | Matsuura et al. |
| 7,580,779 B2 | 8/2009 | Zillmer et al. |
| 7,597,172 B1 | 10/2009 | Kovach et al. |
| 7,600,595 B2 | 10/2009 | Harris |
| 7,610,976 B2 | 11/2009 | Holmes et al. |
| 7,641,018 B2 | 1/2010 | Bissontz |
| 7,654,620 B2 | 2/2010 | Jeon et al. |
| 7,657,350 B2 | 2/2010 | Moran |
| 7,658,250 B2 | 2/2010 | Betz et al. |
| 7,662,062 B2 | 2/2010 | Yang |
| 7,665,559 B2 | 2/2010 | De La Torre-Bueno |
| 7,669,414 B2 | 3/2010 | Loeffler |
| 7,670,253 B2 | 3/2010 | Sah |
| 7,683,569 B2 | 3/2010 | Bloomfield |
| 7,689,331 B2 | 3/2010 | Moran |
| 7,719,232 B2 | 5/2010 | Kelty et al. |
| 7,728,449 B2 | 6/2010 | Kagoshima et al. |
| 7,806,801 B2 | 10/2010 | Gohring et al. |
| 7,841,432 B2 | 11/2010 | Lynn et al. |
| 7,854,282 B2 | 12/2010 | Lee et al. |
| 7,859,202 B2 | 12/2010 | Lukic et al. |
| 7,892,080 B1 | 2/2011 | Dahl |
| 7,900,724 B2 | 3/2011 | Promersberger et al. |
| 7,914,924 B2 | 3/2011 | Sugeno et al. |
| 7,921,950 B2 | 4/2011 | Harris |
| 7,954,581 B2 | 6/2011 | Tanishima |
| 7,994,221 B2 | 8/2011 | Dai et al. |
| 8,115,450 B2 | 2/2012 | Ambrosio et al. |
| 8,118,005 B2 | 2/2012 | Bradley et al. |
| 8,186,465 B2 | 5/2012 | Oyobe et al. |
| 8,190,318 B2 | 5/2012 | Li et al. |
| 8,210,293 B2 | 7/2012 | Ang et al. |
| 8,229,611 B2 | 7/2012 | Yamada |
| 8,275,528 B2 | 9/2012 | Kresse |
| 8,408,341 B2 | 4/2013 | Dalum et al. |
| 8,608,607 B2 | 12/2013 | Kandeth |
| 8,612,076 B2 | 12/2013 | Maini et al. |
| 8,672,066 B2 | 3/2014 | Momal |
| 8,818,588 B2 | 8/2014 | Ambrosio et al. |
| 8,840,524 B2 | 9/2014 | Arsenault et al. |
| 8,978,798 B2 | 3/2015 | Dalum et al. |
| 9,132,824 B2 | 9/2015 | Arsenault et al. |
| 9,151,336 B2 * | 10/2015 | Wesley .................. B60K 17/28 |
| 9,315,187 B2 | 4/2016 | Stenson |
| 9,561,719 B2 * | 2/2017 | Lo .......................... B60K 6/387 |
| 9,751,518 B2 | 9/2017 | Dalum et al. |
| 9,875,440 B1 | 1/2018 | Commons |
| 11,161,403 B2 * | 11/2021 | Lo .......................... B60L 50/15 |
| 2001/0035740 A1 | 11/2001 | Palanisamy |
| 2002/0028376 A1 | 3/2002 | Yamane et al. |
| 2002/0104300 A1 | 8/2002 | Hunt |
| 2002/0108794 A1 | 8/2002 | Wakashiro et al. |
| 2002/0167221 A1 | 11/2002 | Kosik et al. |
| 2003/0054919 A1 | 3/2003 | Matsubara et al. |
| 2003/0062205 A1 | 4/2003 | Konrad et al. |
| 2003/0103850 A1 | 6/2003 | Szulczewski |
| 2003/0145666 A1 | 8/2003 | Warner |
| 2003/0149676 A1 | 8/2003 | Kasabov |
| 2003/0162631 A1 | 8/2003 | Williams |
| 2003/0169002 A1 | 9/2003 | Hughes |
| 2004/0108831 A1 | 6/2004 | Cartwright et al. |
| 2004/0118623 A1 | 6/2004 | Shore et al. |
| 2004/0168449 A1 | 9/2004 | Homan et al. |
| 2004/0207205 A1 | 10/2004 | Kikuchi et al. |
| 2004/0207350 A1 | 10/2004 | Wilton et al. |
| 2004/0251065 A1 | 12/2004 | Komiyama et al. |
| 2005/0012337 A1 | 1/2005 | Yoshimatsu |
| 2005/0082098 A1 | 4/2005 | Ito et al. |
| 2005/0139399 A1 | 6/2005 | Gopal |
| 2005/0167169 A1 | 8/2005 | Gering et al. |
| 2005/0202315 A1 | 9/2005 | Sugeno et al. |
| 2005/0271934 A1 | 12/2005 | Kiger et al. |
| 2006/0032684 A1 | 2/2006 | Rayl |
| 2006/0033469 A1 | 2/2006 | Beaty et al. |
| 2006/0052215 A1 | 3/2006 | Beaty et al. |
| 2006/0068970 A1 | 3/2006 | Rose |
| 2006/0102137 A1 | 5/2006 | Phlips et al. |
| 2006/0116797 A1 | 6/2006 | Moran |
| 2006/0278449 A1 | 12/2006 | Torre-Bueno |
| 2007/0001616 A1 | 1/2007 | Puccetti et al. |
| 2007/0095587 A1 | 5/2007 | Ducharme |
| 2007/0096667 A1 | 5/2007 | Komiyama et al. |
| 2007/0107958 A1 | 5/2007 | Oliver |
| 2007/0108838 A1 | 5/2007 | Shaffer et al. |
| 2007/0124037 A1 | 5/2007 | Moran |
| 2007/0158118 A1 | 7/2007 | King |
| 2007/0181355 A1 | 8/2007 | Harris |
| 2007/0207894 A1 | 9/2007 | Prebeck |
| 2007/0209850 A1 | 9/2007 | Bloomfield |
| 2007/0227296 A1 | 10/2007 | Bordwell et al. |
| 2007/0227801 A1 | 10/2007 | Loeffler |
| 2007/0246274 A1 | 10/2007 | Dreibholz et al. |
| 2007/0278022 A1 | 12/2007 | Tanishima |
| 2008/0071472 A1 | 3/2008 | Yamada |
| 2008/0093143 A1 | 4/2008 | Harrison |
| 2008/0093864 A1 | 4/2008 | Kagoshima et al. |
| 2008/0141800 A1 | 6/2008 | Seitz et al. |
| 2008/0227589 A1 | 9/2008 | Zillmer et al. |
| 2008/0234097 A1 | 9/2008 | Sah |
| 2008/0243324 A1 | 10/2008 | Harris |
| 2008/0264189 A1 | 10/2008 | Hancock |
| 2008/0288132 A1 | 11/2008 | King et al. |
| 2009/0018716 A1 | 1/2009 | Ambrosio |
| 2009/0068547 A1 | 3/2009 | Ambrosio et al. |
| 2009/0095549 A1 | 4/2009 | Dalum et al. |
| 2009/0096471 A1 | 4/2009 | Ambrosio et al. |
| 2009/0143188 A1 | 6/2009 | Soliman et al. |
| 2009/0204280 A1 * | 8/2009 | Simon, Jr. ............. B60W 20/00<br>180/65.265 |
| 2009/0236156 A1 | 9/2009 | Promersberger et al. |
| 2009/0259355 A1 | 10/2009 | Li |
| 2009/0259363 A1 | 10/2009 | Li et al. |
| 2009/0266068 A1 | 10/2009 | Long |
| 2010/0005785 A1 * | 1/2010 | Breuer .................. F02D 41/029<br>60/299 |
| 2010/0006356 A1 | 1/2010 | Curry et al. |
| 2010/0018505 A1 | 1/2010 | Ma et al. |
| 2010/0057281 A1 | 3/2010 | Lawyer et al. |
| 2010/0065358 A1 | 3/2010 | Harris |
| 2010/0130327 A1 | 5/2010 | Morgan, Jr. |
| 2010/0197441 A1 | 8/2010 | Pursifull |
| 2010/0219007 A1 * | 9/2010 | Dalum .................. B60W 10/18<br>180/65.285 |

(56) References Cited

U.S. PATENT DOCUMENTS

| | | |
|---|---|---|
| 2010/0332061 A1 | 12/2010 | Forslow et al. |
| 2011/0022259 A1 | 1/2011 | Niwa |
| 2011/0066308 A1 | 3/2011 | Yang et al. |
| 2011/0172890 A1 | 7/2011 | Ulrey et al. |
| 2011/0174578 A1 | 7/2011 | Richard et al. |
| 2011/0190968 A1 | 8/2011 | Fleming et al. |
| 2011/0264317 A1 | 10/2011 | Druenert et al. |
| 2011/0306455 A1 | 12/2011 | Kandeth |
| 2012/0136524 A1 | 5/2012 | Everett et al. |
| 2012/0207620 A1 | 8/2012 | Dalum et al. |
| 2012/0266701 A1 | 10/2012 | Yamada et al. |
| 2013/0280110 A1 | 10/2013 | Gutjahr et al. |
| 2014/0081895 A1 | 3/2014 | Coenen et al. |
| 2014/0102228 A1 | 4/2014 | Mayer |
| 2014/0169991 A1 | 6/2014 | Byun |
| 2014/0256505 A1 | 9/2014 | Dalum et al. |
| 2014/0350807 A1 | 11/2014 | Arsenault et al. |
| 2015/0100530 A1 | 4/2015 | Mnih et al. |
| 2015/0119192 A1 | 4/2015 | Otanez |
| 2015/0204758 A1 | 7/2015 | Schnell et al. |
| 2015/0360675 A1 | 12/2015 | Nefcy et al. |
| 2016/0238127 A1 | 8/2016 | Nedorezov et al. |
| 2017/0278018 A1 | 9/2017 | Mnih et al. |
| 2017/0355373 A1 | 12/2017 | Dalum |
| 2018/0157973 A1 | 6/2018 | El-Yaniv et al. |
| 2019/0014488 A1 | 1/2019 | Tan et al. |
| 2019/0143957 A1 | 5/2019 | Dalum et al. |

FOREIGN PATENT DOCUMENTS

| | | |
|---|---|---|
| CN | 101052542 A | 10/2007 |
| CN | 101513869 A | 8/2009 |
| CN | 101795884 A | 8/2010 |
| CN | 101868366 A | 10/2010 |
| CN | 102470751 | 5/2012 |
| CN | 102991329 | 3/2013 |
| CN | 103287260 | 9/2013 |
| DE | 27 01 301 | 7/1978 |
| DE | 40 24 384 A1 | 2/1992 |
| DE | 41 02 822 | 8/1992 |
| DE | 41 02 882 A1 | 8/1992 |
| DE | 42 04 384 A | 8/1993 |
| DE | 19748423 | 2/1999 |
| DE | 19748423.3 | 2/1999 |
| DE | 10203514 | 8/2003 |
| DE | 10203514.4 | 8/2003 |
| DE | 10 2007 016 514 A1 | 10/2008 |
| EP | 0 492 152 A | 7/1992 |
| EP | 2 055 548 | 5/2009 |
| EP | 2 551 140 A1 | 1/2013 |
| JP | 03-114638 Y2 | 5/1991 |
| JP | 08-308020 | 11/1996 |
| JP | 08-322107 A | 12/1996 |
| JP | 09-163616 | 6/1997 |
| JP | 10-037904 | 2/1998 |
| JP | H10-037904 | 2/1998 |
| JP | H11-069509 A | 3/1999 |
| JP | H11-115743 A | 4/1999 |
| JP | 2000-115912 | 4/2000 |
| JP | 2000-156917 A | 6/2000 |
| JP | 2000-170888 | 6/2000 |
| JP | 2000-287307 A | 10/2000 |
| JP | 2001-008309 A0 | 1/2001 |
| JP | 2001-112117 A | 4/2001 |
| JP | 2001-254643 | 9/2001 |
| JP | 2002-046507 A | 2/2002 |
| JP | 2002-171601 A | 6/2002 |
| JP | 2003-191762 A | 7/2003 |
| JP | 2003-232412 A | 8/2003 |
| JP | 2004-006136 A | 1/2004 |
| JP | 2004-100504 A | 4/2004 |
| JP | 2004-166363 A | 6/2004 |
| JP | 2004-254402 A | 9/2004 |
| JP | 2005-005438 A | 1/2005 |
| JP | 2005-102492 A | 4/2005 |
| JP | 2005-351381 A | 12/2005 |
| JP | 2007-062640 A | 3/2007 |
| JP | 2007-068358 A | 3/2007 |
| JP | 2007-069788 | 3/2007 |
| JP | 2007-089262 A | 4/2007 |
| JP | 2007-106385 | 4/2007 |
| JP | 2007-107231 | 4/2007 |
| JP | 2007-177694 A | 7/2007 |
| JP | 2009-292287 A | 12/2009 |
| JP | 2011-501714 A | 1/2011 |
| JP | 2011-525448 A | 9/2011 |
| WO | WO-92/01584 | 2/1992 |
| WO | WO-2007/097819 | 8/2007 |
| WO | WO-2009/009078 A1 | 1/2009 |
| WO | WO-2009/049066 A2 | 4/2009 |
| WO | WO-2009/088406 A2 | 7/2009 |
| WO | WO-2009/117574 A1 | 9/2009 |

OTHER PUBLICATIONS

U.S. Appl. No. 60/959,181, filed Jul. 12, 2007, Ambrosio et al.

2012 Honda Civic Hybrid v. 2011 Toyota Prius Five Comparison Test, www.edmunds.com/toyota/prius/2011/comparison-test.html, retrieved on Apr. 19, 2013, 9 pages.

AZD, Azure Dynamics, Electric Drive Solutions, AZD Force Drive, We Drive a World of Difference; available at least by May 30, 2008, 2 pages.

AZD, Azure Dynamics, Force Drive Electric Solutions, Force Drive Electric Vehicles Zero Emissions, http://www.azuredynamics.com/products/force-drive/traction-motors.htm; retrieved on Sep. 17, 2008, 2 pages. Sep. 17, 2008; 2 pgs.

AZD, Azure Dynamics, LEEP, Low Emission Electric Power System, AZD Has One of the Largest Hybrid Technology Engineering Teams in the World; available at least by May 30, 2008, 2 pages.

AZD, Azure Dynamics, Parallel Hybrid Electric Ford E450 Cutaway and Strip Chassis, available at least by May 30, 2008, 2 pages.

AZD, Azure Dynamics, Series Hybrid Electric Azure CitiBus, Our drive can make your difference; available at least by May 30, 2008; 2 pgs.

Balance Hybrid Electric E450 Drive System Hybrid Trucks, http://www.azuredynamics.com/products/balance-hybrid-electric.htm; retrieved on Sep. 17, 2008, 2 pages.

Blanco, Odyne, Dueco Will Build PHV Aerial Lift Truck, http://autobloggreen.com/2007/05/07/odyne-dueco-will-build-phev-aerial-lift-truck/, retrieved on on Jan. 3, 2009, 6 pages.

Burke, A Deep Impression, Technology of Clean Air, Diesel Progress North American Edition, Jul. 2013, 3 pages.

Cai, Integrated Starter Alternator, Automotive Power Electronics and Motor Drives, 2005, 55 pages.

CitiBus Hybrid Electric StarTrans, CitiBus HD Senator, http://www.azuredynamics.com/products/citibus-hybrid-electric.htm; retrieved on Sep. 17, 2008, 2 pages.

Communication and Supplementary European Search Report for Application No. EP08794431, mail date May 24, 2011, 7 pgs.

Computer Translation of Foreign Patent Document DE 40 24 384 A1, 14 pages.

Dueco, Hybrid Vehicle, TL50M Dueco's Plug-In Hybrid Electric Vehicle (PHEV), www.dueco.com, available at least by May 30, 2008, 1 page.

Dueco/Odyne Corporation, Partners in Green Technology for the Utility Industry, Hybrid Power, PHEV-Diesel Electric, www.dueco.com, available at least by May 30, 2008, 1 page.

Eaton, Freightliner LLC, Daimler Chrysler Truck Group, M2 Proof of Concept HEV Utility Truck Specs; available at least by May 30, 2008, 2 pages.

Eaton, Hybrid Power Systems, Roadranger, Eaton's Medium-Duty Hybrid Electric System Provides Up to 60% Fuel Savings and Significantly Reduces Emissions as Compared to a Conventional Drivetrain, www.roadranger.com., 2006, 2 pages.

Electric Hybrid, www.eaton.com/Eaton, ProductsServices/Truck/HybridPower/SystemsOveriview/El . . . , retrieved on Oct. 25, 2013, 1 page.

(56) References Cited

OTHER PUBLICATIONS

Green Car Congress, Nissan Adds Diesel Hybrid and CNG Models to Atlas H43 Lineup, http://www.greencarcongress.com/2007/09/nissan-adds-die.html; retrieved on Jun. 23, 2009, 2 pages.

Hodges, Is There a Hybrid in Your Future?, http://www.lmtruck.com/articles/petemplate.aspx?storyid=116, retrieved on Jun. 6, 2008, 6 pages.

Hybrid Electric Vehicles LEEP Systems/Azure Dynamics, LEEP Systems/Freeze/Lift, http://www.azuredynamics.com/products/leep-system.htm, retrieved on Sep. 17, 2008, 1 page.

HyPower by Terex, Low Carbon Footprint, Plug-In Power Hybrid System, 2009, 2 pages.

Integrated Motor Assist (IMA), http://wikicars.org/es/Integrated_Motor_Assist_(IMA), retrieved on Apr. 19, 2013, 7 pages.

Integrated Motor Assist, http://en.wikipedia.org/wiki/Integrated_Motor_Assist, retrieved on Oct. 7, 2013, 3 pages.

International Search Report and Written Opinion for International Appl. No. PCT/US2008/079376, mail date Apr. 9, 2009, 9 pgs.

International Search Report and Written Opinion for International Application No. PCT/US08/08442, mail date Sep. 26, 2008, 7 pages.

International Search Report and Written Opinion for International Application No. PCT/US2009/037664, mail date Aug. 3, 2009, 9 pages.

International Search Report and Written Opinion for PCT/US2009/066151 dated Jul. 15, 2010, 10 pages.

International Search Report and Written Opinion received in PCT Application No. PCT/US2014/066223, dated Feb. 24, 2015, 11 pages.

International Search Report and Written Opinion regarding PCT/US2012/029835, mail date Dec. 26, 2012, 7 pages.

International Search Report and Written Report for Application No. PCT/US2013/036431, mail date Jul. 23, 2013, 12 pages.

Isuzu ELF Diesel Hybrid description from Isuzu.com—different pages of complete report retrieved from web.archieve.org on various dates such as May 9, 2006, Sep. 5, 2006, Oct. 31, 2006 for the pages included with the Office Action for U.S. Appl. No. 12/130,888, 6 pages.

Isuzu, Introduction of ELF Diesel Hybrid, http://www.isuzu.co.jp/world/technology/randd/project6/01.html, retrieved on Nov. 1, 2007, 2 pages.

Isuzu, Low Pollution Alternative Fuel Vehicles, http://www.isuzu.co.jp/world/technology/low/index.html, retrieved on Jun. 22, 2009, 3 pages.

Li et al., Power Management System for Plug-In Hybrid Electric Vehicles, 2012, 2 pages.

Li, Trip Based Optimal Power Management for Plug-In Hybrid Electric Vehicles, OTT ID #1127, Mar. 9, 2012, 20 pages.

Machine translation of JPH1037904 obtained from http://translationportal.epo.org/emtp/translate/.

Odyne Corp. Receives Order for Twenty-Five Plug-In Hybrid Systems from Dueco, Inc., http://www.businesswire.com/portal/site/home/index.jsp?epi_menuItemID=887566059a3ae . . . , retrieved on Jan. 3, 2008, 3 pages.

Ogando, Hydraulic Powertrains Propel These Hybrid Trucks; http://www.designnews.com/article/CA6451735.html?nid=2874#_self; Jun. 13, 2007; 5 pages.

Palumbo et al., Ultracapacitor Based Hybrid Booster Drive®, Jun. 2004, 16 pages.

Powderly, Odyne to Ship 25 Plug-In Systems to Dueco Inc., http://www.libn.com/breakingnews.htm?articleID=9497, Dec. 20, 2007, 2 pages.

Sherosky, Stop-Start Technology Especially Challenging for Micro-Hybrid Engineers, Torque News, Jan. 28, 2011, 3 pages.

ThomasNet, Aerial Lift Truck Delivers Plug-In Hybrid Functionality, http://news.thomasnet.com/fullstory/535299, retrieved on Jan. 3, 2008, 4 pages.

Vasilash, Power Trains 2005, Hybrid Powertrains: The Two-Mode Approach, http://www.autofieldguide.com/articles/article_print1.cfm, retrieved on Jun. 24, 2009, 3 pages.

Vehicle Technology.org, Advanced GM Allison Two-Mode Parallel Hybrid Technology Ready for Europe, Energy Storage System (ESS), http://www.vehicletecnology.org/vt2007/38.html, retrieved on Jun. 22, 2009, 3 pages.

Vehicle Technology.org, Advanced GM Allison Two-Mode Parallel Hybrid Technology Ready for Europe, http://www.vehicletecnology.org/vt2007/36.html, retrieved on Jun. 6, 2008, 2 pages.

* cited by examiner

HYBRID VEHICLE DRIVE SYSTEM AND METHOD FOR FUEL REDUCTION DURING IDLE

CROSS-REFERENCE TO RELATED PATENT APPLICATIONS

This application is a continuation-in-part of U.S. application Ser. No. 15/588,232, filed May 5, 2017, now U.S. Pat. No. 11,225,240 which is a continuation of U.S. application Ser. No. 14/745,232, filed Jun. 19, 2015, (096637-0170), now U.S. Pat. No. 9,643,593 which is a continuation of U.S. application Ser. No. 14/081,892 filed Nov. 15, 2013, now U.S. Pat. No. 9,061,680, which is a Continuation-In-Part of US Application PCT/US2013/036431, filed Apr. 12, 2013 which claims priority to Provisional Application U.S. Application 61/624,118, filed Apr. 13, 2012, all of the above patent applications and patents are incorporated herein by reference in their entireties. This application is also a continuation-in-part of U.S. application Ser. No. 15/067,419 filed Mar. 11, 2016 which is a continuation of U.S. application Ser. No. 13/812,723 filed Jan. 28, 2013, now U.S. Pat. No. 9,283,954, which claims priority to PCT Application 2012/029835, published as Publication No. WO2013/081657 having a filing date of Mar. 20, 2012, which claims the benefit of priority under 35 U.S.C. § 119(e) to U.S. Provisional Application Ser. No. 61/566,526 (096637-0142), filed on Dec. 2, 2011, all of the above patent applications and patents are incorporated herein by reference in their entireties.

The application is related to application Ser. No. 13/629,533 filed Sep. 27, 2012, now U.S. Pat. No. 8,905,166 (0147) which is a divisional of U.S. Pat. No. 8,408,341 which:

- is a continuation-in-part of U.S. patent application Ser. No. 12/130,888, filed May 30, 2008, now U.S. Pat. No. 8,978,798 (0106), which claims the benefit of priority under 35 U.S.C. § 119(e) to U.S. Provisional Application No. 60/979,755, filed Oct. 12, 2007, and U.S. Provisional Application No. 61/014,406, filed Dec. 17, 2007;
- is a continuation-in-part of U.S. patent application Ser. No. 12/217,407, filed Jul. 3, 2008, now U.S. Pat. No. 8,818,588 (0115), which claims the benefit of priority under 35 U.S.C. § 119(e) to U.S. Provisional Application No. 60/959,181, filed Jul. 12, 2007, and U.S. Provisional Application No. 61/126,118, filed May 1, 2008;
- is a continuation-in-part of PCT/US2009/066151, filed Nov. 30, 2009, published as Publication No. WO2010/065476 which claims the benefit of priority to U.S. Provisional Application No. 61/177,240, filed May 11, 2009, and U.S. Provisional Application No. 61/118,980, filed Dec. 1, 2008, and U.S. Provisional Application No. 61/235,998, filed Aug. 21, 2009, and U.S. Provisional Application No. 61/251,285, filed Oct. 13, 2009;
- is a continuation-in-part of PCT/US2008/008442, filed Jul. 10, 2008; published as Publication No. WO2009/009078 and
- is a continuation-in-part of PCT/US2008/079376, filed Oct. 9, 2008, published as Publication No. WO2009/049066 which is a continuation of U.S. application Ser. No. 12/130,888, filed on May 30, 2008, now U.S. Pat. No. 8,978,798 which claims the benefit of priority to U.S. Provisional Application No. 60/979,755, filed on Oct. 12, 2007, and U.S. Provisional Application No. 61/014,406, filed on Dec. 17, 2007. All of the above patents and applications are incorporated herein by reference in their entireties.

BACKGROUND OF THE INVENTION

The present disclosure relates to vehicle drive systems. More particularly, the present disclosure relates to hybrid vehicle drive systems.

Hybrid vehicle drive systems commonly employ at least two prime movers arranged in different configurations relative to a transmission. One known configuration is found in so-called "series-parallel" hybrids. "Series-parallel" hybrids are arranged such that multiple prime movers can power the drive shaft alone or in conjunction with one another.

In one known hybrid vehicle drive system, a first and second prime mover (e.g., an internal combustion engine and an electric motor/generator) are arranged in a parallel configuration and used to provide power to a drive shaft and a power take-off (PTO) shaft through a transmission. PTO shafts are generally used to drive auxiliary systems, accessories, or other machinery (e.g., pumps, mixers, barrels, winches, blowers, etc.). One limitation of this system is that the second prime mover is typically positioned between the first prime mover and the transmission, creating the need to reposition existing drive train components.

In another hybrid vehicle drive system, a first prime mover (e.g., an internal combustion engine) drives a PTO through a transmission. A second prime mover (e.g., electric motor/generator) has been coupled directly to the PTO and is discussed in the applications incorporated herein by reference.

Hybrid systems used in larger trucks, greater than class 4, have typically utilized two basic design configurations—a series design or a parallel design. Series design configurations typically use an internal combustion engine (heat engine) with a generator or fuel cell to produce electricity for both the battery pack and the electric motor that is used to propel the vehicle. There is typically no direct mechanical power connection between the internal combustion engine or fuel cell (hybrid power unit) and the wheels in an electric series design. Series design hybrids often have the benefit of having a no-idle system, including an engine-driven generator that enables optimum performance, lacking a transmission (on some models), and accommodating a variety of options for mounting the engine and other components. However, series design hybrids also generally include a larger, heavier battery; have a greater demand on the engine to maintain the battery charge; and include inefficiencies due to the multiple energy conversions. Parallel design configurations have a direct mechanical connection between the internal combustion engine and the wheels in addition to an electric or hydraulic motor to drive the wheels. Parallel design hybrids have the benefit of being capable of increased power due to simultaneous use of the engine and electric motor, having a smaller engine with improved fuel economy while avoiding compromised acceleration power, and increasing efficiency by having minimal reduction or conversion of power when the internal combustion engine is directly coupled to the driveshaft. However, parallel design hybrids typically lack a no-idle system and may have non-optimal engine operation (e.g., low rpm or high transient loads) under certain circumstances. Existing systems on trucks of class 4 or higher have traditionally not had a system that combines the benefits of a series system and a parallel system.

Therefore, a need exists for a hybrid vehicle drive system and method of operating a hybrid vehicle drive system that allows a drive shaft to receive power from at least three components. There is also a need for a hybrid vehicle drive system that allows for the prevention of friction and wear by disengaging unused components. There is a further need for a hybrid vehicle drive system that uses regenerative braking to store energy in at least two rechargeable energy sources. Still further, there is a need for a new non-PTO-based and PTO-based hybrid system. Further still, there is a need for a hybrid system optimized for use with a hydraulic system of the vehicle.

The need exists for systems and methods of reducing fuel consumption during idle. Sophisticated power train control systems and power management systems required for the operation of a hybrid vehicle drive system can add cost and complexity. Therefore there is a need for a fuel reduction system during idle that is inexpensive. There is also a need for a system that can use existing vehicle components to reduce idle fuel consumption. There is also a need for a system that can provide power to the equipment from two sources simultaneously (vehicle engine and electric motor) during periods when equipment power requirements exceed the output of only an electric motor driven pump. There is further a need for construction equipment or vehicles configured for hybrid operation and idle fuel reduction.

There is a further need for a series/parallel design in which the system can operate using either series or parallel configurations depending upon which is most advantageous given operating requirements. Further still, there is a need for a configurable hybrid drive system that can be configured for optimal idle usage.

SUMMARY

One embodiment relates to a hybrid vehicle drive system for a vehicle including a first prime mover, a first prime mover driven transmission and a rechargeable power source. The hybrid vehicle drive system further includes an electric motor in direct or indirect mechanical communication with the first prime mover. The electric motor can provide power to the first prime mover. A control system eliminates fuel to the first prime mover and uses the electric motor to operate the first prime mover while the vehicle is stopped.

Some embodiments relate to a vehicle drive system for a vehicle comprising a first prime mover, a power take off and a first prime mover driven transmission in mechanical communication with the power take off. the vehicle drive system includes an electric motor in direct or indirect mechanical communication with the first prime mover via the power take off and a control system configured to cause the electric motor to rotate the first prime mover via the power take off. The control system operates on a balanced mode where the control system determines a torque for the electric motor based upon driver inputs, determines total torque needed to move the vehicle, and subtracts out the amount provided by the electric motor to obtain a first prime mover torque. The control system causes the first prime mover to provide the prime mover torque.

An exemplary embodiment relates to a hybrid vehicle drive system for use with a prime mover and a first transmission driven by the first prime mover. The system includes a second prime mover coupled to a rechargeable energy source, an interface and an accessory. The accessory is configured to be coupled to the second prime mover. The first prime mover is configured to provide power through the interface to the second prime mover to operate the second prime mover, and the second prime mover is configured to provide power to the drive shaft through the interface. The interface is before a transmission gear capable of driving a PTO. The accessory is configured to be coupled to the second prime mover so the accessory is operated through the operation of the second prime mover.

Another exemplary embodiment relates to a method of retrofitting a vehicle with a hybrid vehicle drive system. The vehicle includes a prime mover driven transmission and a first prime mover. The method includes attaching an electric motor at in interface between the transmission and the first prime mover. The interface is a gear attached to a fly wheel coupled to the first prime mover, a ring gear, or a gear attached to a crank shaft of the first prime mover. Alternatively, a PTO may be directly connected to a first prime mover driven transmission at one end and a second prime mover at the other end. The method also includes providing an accessory attached to the second prime mover.

An exemplary embodiment relates to a vehicle drive system for a vehicle including a first prime mover, a first prime mover driven transmission, and a rechargeable power source. The vehicle drive system includes an electric motor and a control system. The electric motor is in direct or indirect mechanical communication with the first prime mover. The electric motor can receive power from the first prime mover driven transmission and can receive power from the first prime mover. The control system causes the electric motor to rotate the first prime mover at a speed at least at an idle set point of the first prime mover while the vehicle is stopped, thereby reducing fuel consumption at idle for the vehicle.

Another exemplary embodiment relates to a vehicle drive system for a vehicle including a first prime mover, a first prime mover driven transmission, and a rechargeable power source. The vehicle drive system includes an electric motor in direct or indirect mechanical communication with the first prime mover. The vehicle drive system also includes a control system. The control system causes the electric motor to rotate the first prime mover at a speed so that the first prime drives an accessory without consuming fuel while the vehicle is stopped, thereby reducing fuel consumption at idle for the vehicle.

Another exemplary embodiment relates to a method of retrofitting a vehicle with a hybrid vehicle drive system. The vehicle includes a first prime mover, and a prime mover driven transmission. The method includes attaching an electric motor at a PTO or an interface to be in mechanical communication with the first prime mover. The interface can be a gear attached to a flywheel coupled to the first prime mover, a ring gear, or a gear attached to a crank shaft of the first prime mover. A belt, chain or additional gears may optionally be used to transmit power from the electric motor. The method also includes operating the electric motor when the vehicle is stopped to drive an accessory driven by the first prime mover during idle to reduce fuel consumption.

Another exemplary embodiment relates to a method of retrofitting a vehicle with a hybrid vehicle drive system. The vehicle includes a first prime mover and a prime mover driven transmission. The method includes attaching an electric motor to an interface or a PTO to be in mechanical communication with the transmission and the first prime mover. The interface can be a gear attached to a fly wheel coupled to the first prime mover or a gear attached to a crank shaft of the first prime mover. The method also includes operating the electric motor when the vehicle is stopped to drive an accessory with the first prime mover without consuming fuel in the first prime mover.

In some embodiments, a second transmission fluid pump provides a flow of fluid through a component (e.g., a power take off). The pump is driven by an electric motor and the flow of fluid helps to cool the component. In some embodiments, the second pump operates when the chassis is stationary, and the second pump operates when the second prime mover operates.

BRIEF DESCRIPTION OF THE DRAWINGS

Embodiments will be described with reference to the accompanying drawings, wherein like reference numerals indicate like elements, and.

DETAILED DESCRIPTION

Figure 1:
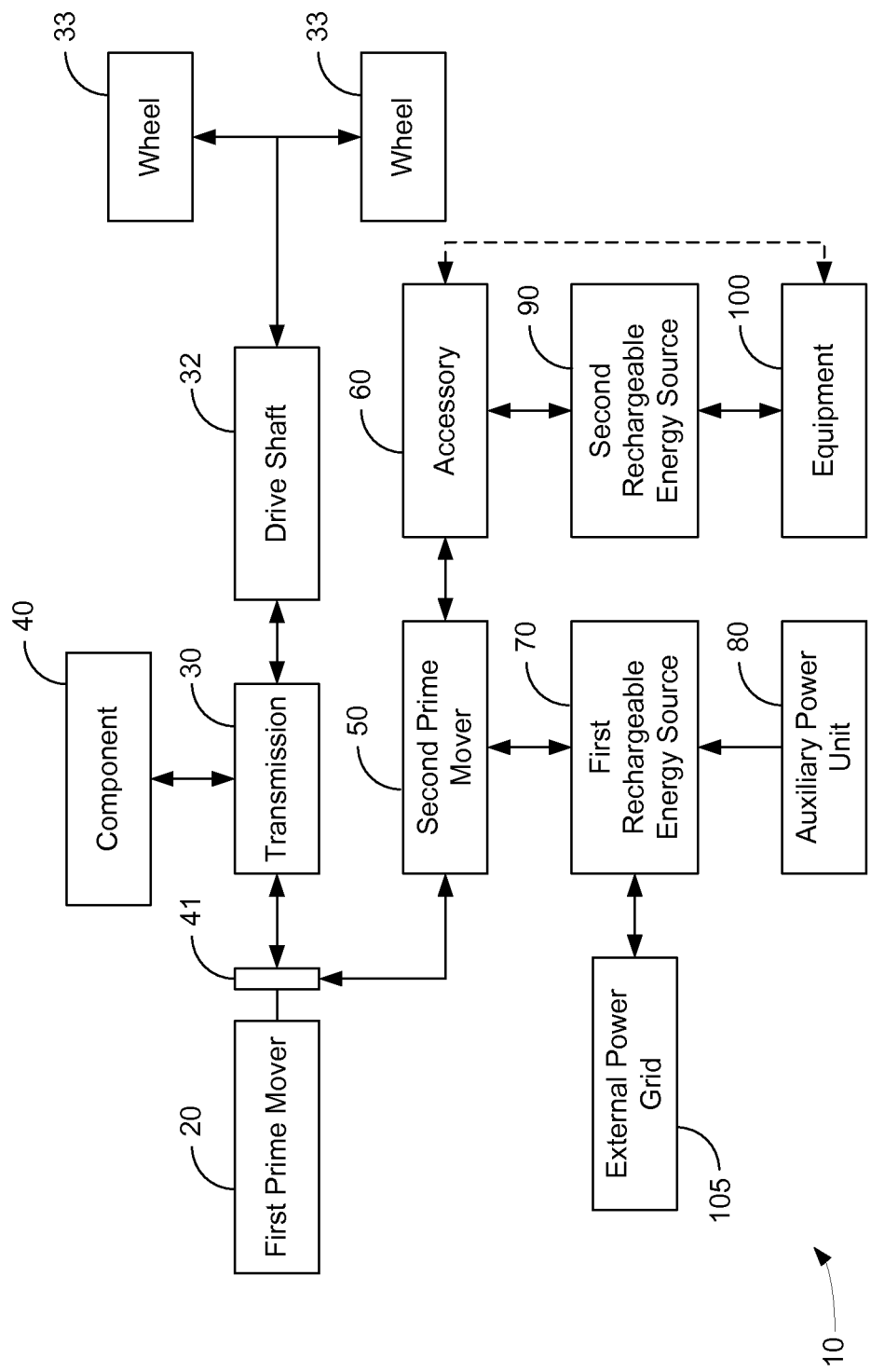
FIG. 1 is a general block diagram of a hybrid vehicle drive system according to an exemplary embodiment.

Hybrid vehicle drive systems according to several possible embodiments are presented. One feature of one exemplary embodiment of the hybrid vehicle drive system is that the hybrid drive system can utilize an interface between the first prime mover and the transmission without using a PTO. Alternatively, one exemplary embodiment of the hybrid vehicle drive system is that the hybrid drive system can utilize a PTO interface to drive electrical or hydraulic motors as discussed in the PTO hybrid architectures discussed in the applications incorporated herein by reference. Another feature of one embodiment is that a drive shaft can be powered singly or in any combination by a first prime mover, a second prime mover, and an accessory using the interface or the PTO interface. Preferred embodiments incorporate hydraulic systems into the hybrid vehicle drive system for optimal energy storage and usage. It is noted that the term motor as used herein refers to a motor/generator or motor/pump and is not limited to a device that performs only motor operations.

According to one embodiment, inefficiencies are reduced during regenerative braking by removing the first prime mover from the system when vehicle braking occurs. Yet another feature of one exemplary embodiment of the system is that the accessory (e.g., hydraulic pump, pneumatic pump, electric motor, etc.) can be powered singly or in any combination by the first prime mover, the second prime mover, energy from braking, or energy stored in a second rechargeable energy source (e.g., battery, ultra capacitor hydraulic accumulator, etc.). The presence of a second rechargeable energy source also can obviate the need for a complicated pump control system when the accessory is a hydraulic pump. If the pump is a variable volume displacement pump, further simplification is possible because a clutch may not be needed between the second prime mover and the pump. Other types of pumps can also be used. According to one exemplary embodiment, with a clutch between the second prime mover and the hydraulic pump, the pump can be an inexpensive gear pump.

Yet another feature of one exemplary embodiment of the system is that a first rechargeable energy source connected to the second prime mover can be recharged in one or more modes. These modes include: the second prime mover using power from the first prime mover; the second prime mover using power from regenerative braking; the accessory using energy stored in the second rechargeable energy source to operate the second prime mover; an auxiliary power unit connected to the first rechargeable energy source; using an engine alternator when present (the alternator can be increased in capacity to allow for this additional charge while driving or idle); using a lower voltage vehicle battery system using a DC to DC converter, or using an external power source, such as being directly plugged into an external power grid. In one embodiment, a DC/DC converter can step up 12V and to 300+V for charging when the engine is on, or when the second prime mover is not available to recharge first rechargeable energy source.

The second prime mover can draw upon this power stored in the first rechargeable power source before daily operation of the vehicle (e.g., after overnight charging), when the vehicle is stopped, or in other situations. In such situations, the second prime mover can operate the accessory to pre-charge or pressurize the second rechargeable energy source before the energy is needed, which would provide higher density power storage when the second rechargeable power source is a hydraulic accumulator, among other advantages. A higher density energy storage device is intended to provide more available power at low revolutions per minute (RPM) operation and an overall lower mass system.

In one embodiment, the hybrid system and method reduces fuel consumption at idle. A second prime mover increases RPMs of the first prime mover to a speed at or above an idle set point so that fuel consumption is reduced during idle.

The idle set point of the first prime mover can refer to the number of revolutions per minute (rpm) or idle speed that the engine controller, engine control unit, or other controller commands the first prime mover to rotate when the vehicle is stationary in one embodiment. While stationary, loads on the first prime mover, such as heating, ventilation and air conditioning (HVAC), loads due to movement of the torque converter in a vehicle with an automatic transmission, or other loads, may affect the torque that the first prime mover must produce to maintain the idle speed determined by the controller. The controller can adjust power produced by the first prime mover while vehicle is stationary in response to the loads on the engine, typically by commanding the first prime mover to use more or less fuel. The method of using the second prime mover, often an electric motor, to increase the speed of first prime mover, reduces the need for fuel use by the first prime mover in one embodiment. If the first prime mover controller senses that the rotational speed of the prime mover is above the target rotational speed for idle, or if it senses that no torque is needed by the first prime mover to maintain the target idle rpm, the first prime mover will reduce or stop using fuel in response to the conditions. The first prime mover may reduce or stop using fuel, even though there may not be bi-directional electronic communication between the controller for the second prime mover and the controller for the first prime mover in one embodiment.

In certain embodiments, the first prime mover may reduce fuel consumption only in response to the actual speed of the first prime mover being higher than the commanded speed of the first prime mover, and/or the absence of a request for torque to maintain a commanded speed of the first prime mover. This method significantly reduces the complexity of coordinating a reduction in fuel use while the vehicle is stationary when multiple movers are used in the vehicle according to one embodiment. Alternatively, the electric motor does not have to be a motor intended to provide propulsion.

In one embodiment, the control system or alternatively, a controller, such as a transmission controller, may send requests for reduced torque to the controller for the first prime mover, while sending requests for greater torque to the second prime mover. Energy for the second prime mover may be provided by a stored energy system, such as a battery system or ultra-capacitor, or hydraulic accumulator. In one example, the energy may be provided by a Li-Ion battery system that can be recharged by the grid or other means.

Various additional aspects and advantages will become apparent to those skilled in the art from the following detailed description of the embodiments.

Figure 5:
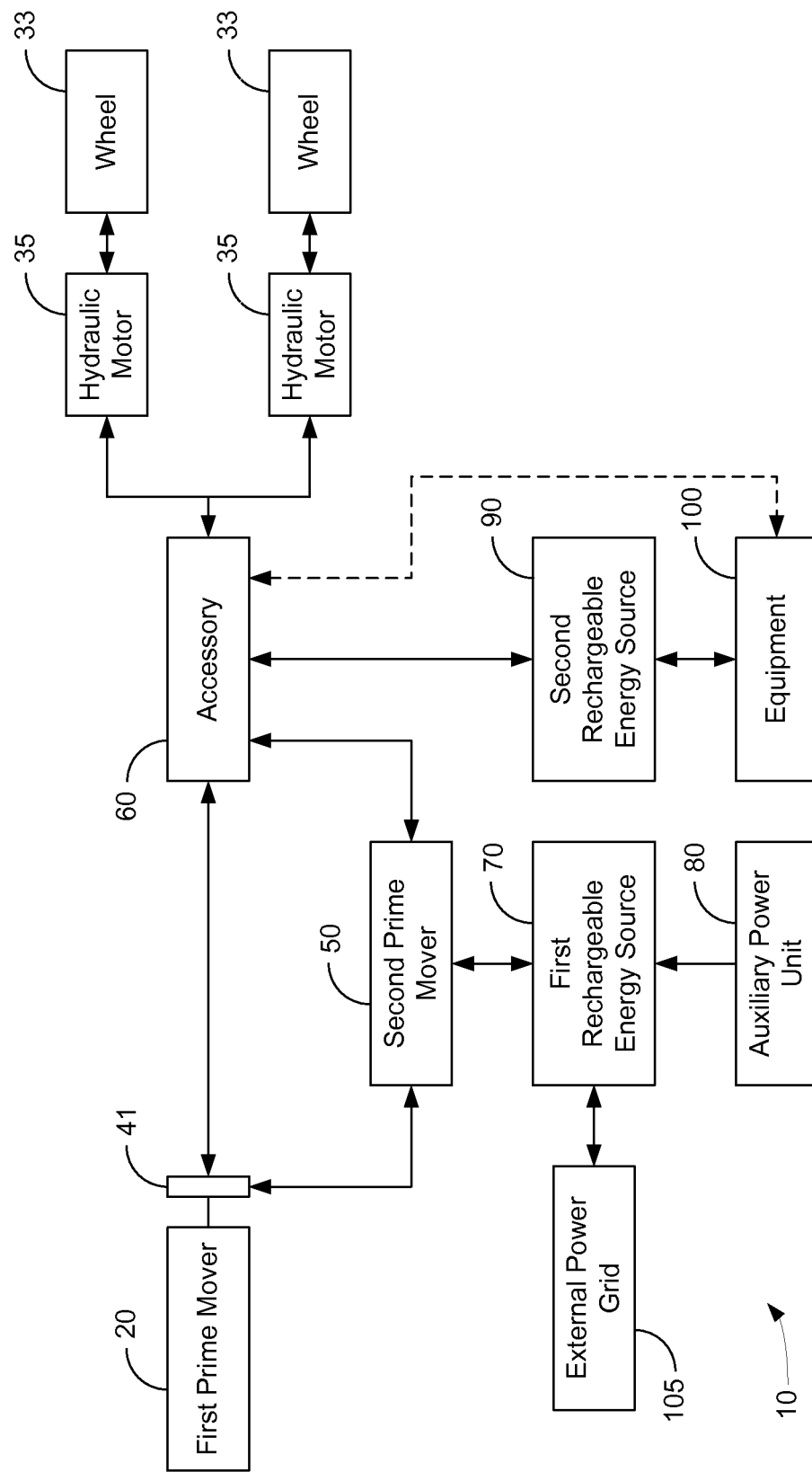
FIG. 5 is a general block diagram of a hybrid vehicle drive system according to yet another exemplary embodiment.
Figure 6:
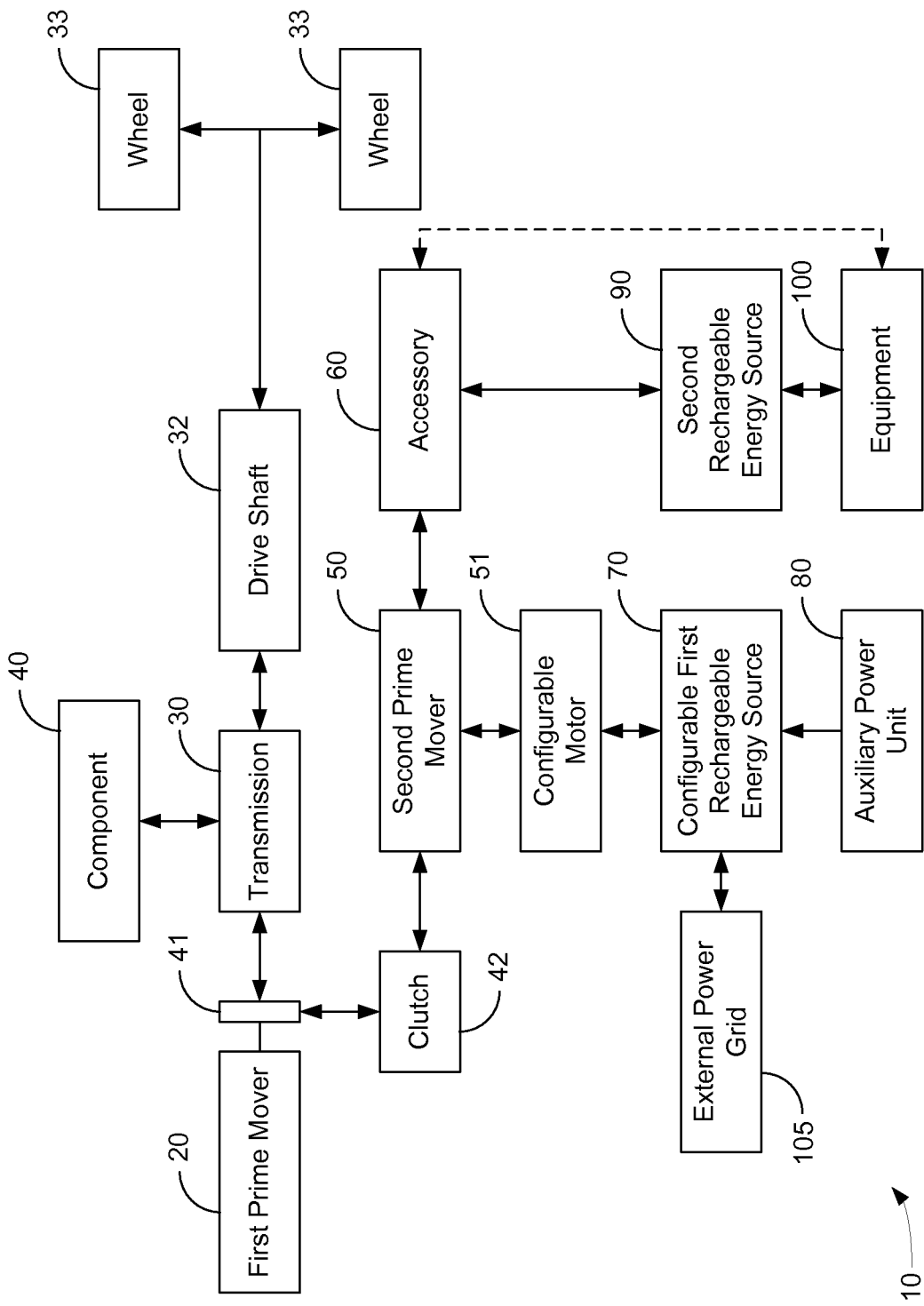
FIG. 6 is a general block diagram of a hybrid vehicle drive system according to still yet another exemplary embodiment.
Figure 7:
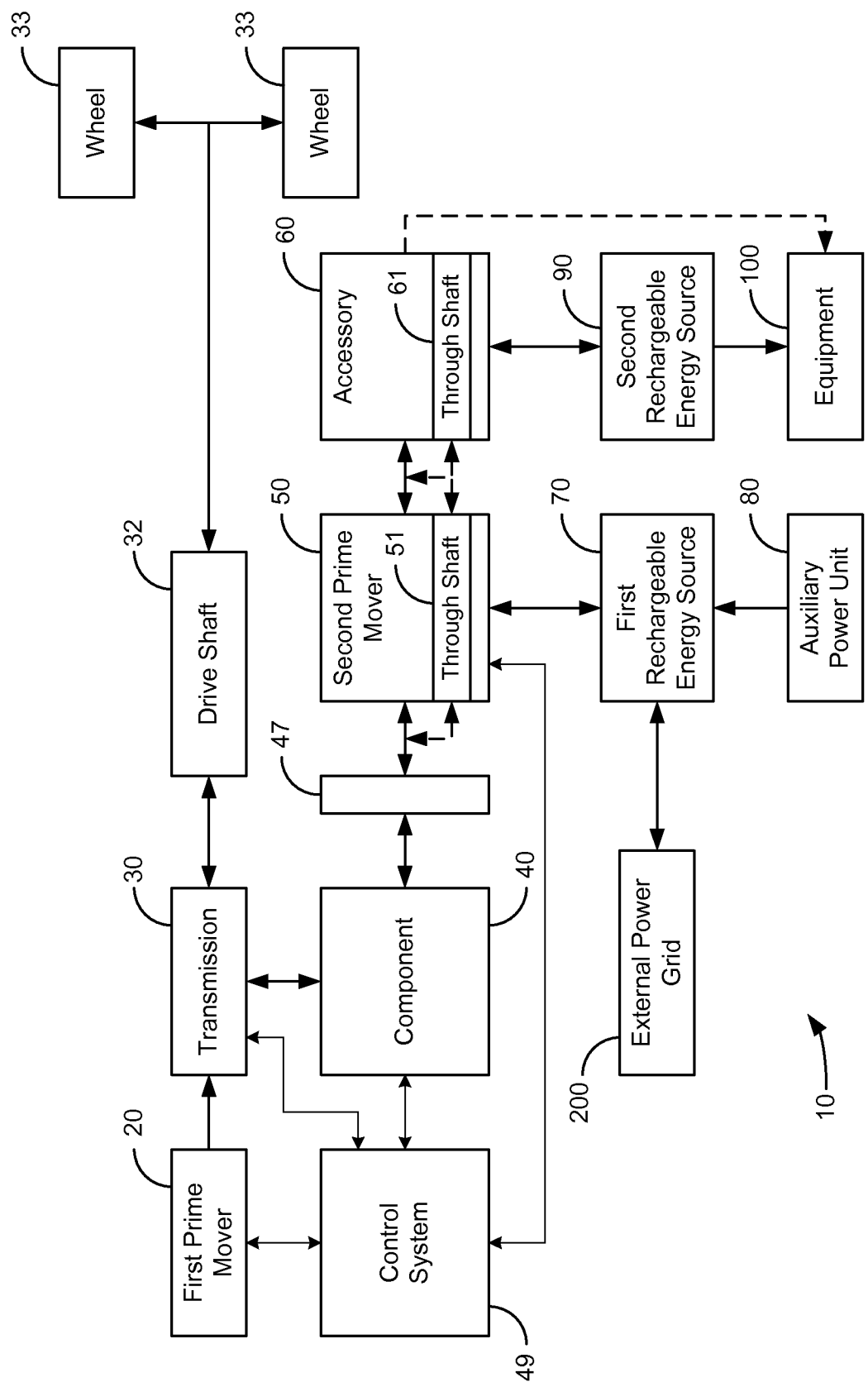
FIG. 7 is a general block diagram of a hybrid vehicle drive system according to an exemplary embodiment.

Referring to FIGS. 1-8, hybrid vehicle drive systems 10 according to several exemplary embodiments are shown. Various features of these embodiments can be employed in other embodiments described herein. It is noted that any of the embodiments of FIGS. 1-20 of U.S. patent application Ser. No. 12/710,247, now U.S. Pat. No. 8,408,341 (incorporated herein by reference in its entirety) could substitute the interface between the second prime mover and the first prime mover in the present application for the PTO configurations in U.S. patent application Ser. No. 12/710,247. For example, FIG. 7 shows a hybrid drive system 10 with a PTO or component 40 coupled to a prime mover 50 and an accessory 60 via one or more through shafts 51 and 61. Through shaft 61 can have one or more through shafts if one more additional pumps are attached as "piggyback pumps." Shaft 61 in accessory 60 may alternately terminate within the accessory 60 housing. Alternatively, other types of connections between component 40 and mover 50 and accessory 60 can be utilized. An optional clutch 47 can be disposed between component 40 and mover 50, between mover 50 and accessory 60, or between accessory 60 and component 40 An electronic control system 49 similar to a control system 14 discussed in U.S. application Ser. No. 13/812,373, incorporated herein by reference or VMCS 6 discussed in U.S. application Ser. No. 12/217,407 incorporated herein by reference can control and/or communicate with mover 20, mover 50, component 40, transmission 30, clutch 47, etc.

Embodiments of system 10 can include series parallel configurations in which prime mover 20 and the second prime mover 50 are coupled via the flywheel/crankshaft though a gear or other means, while a clutch resides behind the flywheel or gear that connects the prime mover 20 and second prime mover 50. A third prime mover can be attached to the PTO that is coupled to the pump portion or turbine section of transmission 30 (e.g., in an automatic transmission embodiment).

The system can be the same hybrid system as shown in FIG. 1-5, 7, 9-11, 13, 14, 15, 18, 19, 20, in U.S. patent application Ser. No. 12/130,888 (incorporated herein by reference in its entirety) unmodified or modified to have an interface 41 according to certain embodiments. In an Allison 3000 or 4000 series transmission (or any other transmission in which the PTO gear in transmission 30 is "live", (e.g., coupled to the crankshaft of mover 20)), advantages can be achieved if component 40 is instead connected to a gear (or other means of mechanical power connection) with the crankshaft or flywheel that is located between prime mover 20 and the transmission 30. In FIG. 6 of U.S. patent application Ser. No. 12/130,888, a gear can be coupled to a shaft between the clutch 165 and transmission 30 in one embodiment. The gear interfaces with component 40, instead of having component 40 interface with transmission 30. Component 40 can be a front mounted or rear mounted PTO.

As shown in FIG. 1, an exemplary embodiment of a hybrid vehicle drive system 10 can be employed on any type of vehicle. According to one embodiment, the vehicle can be any type of light, medium, or heavy duty truck. In one preferred embodiment, the vehicle is a truck that employs hydraulic systems such as a boom truck. Alternatively, the vehicle can be any type of platform where hybrid systems are employed. The vehicle may have a wide variety of axle configurations including, but not limited to a 4×2, 4×4, or 6×6 configuration. As discussed with reference to FIG. 5, the vehicle associated with system 10 can be a tracked vehicle, a tractor, or construction equipment (e.g., loader, backhoe, paver, steam roller, road roller, roller-compactor, skid steer, forklift, excavator, mini-excavator, track crane, bull dozer, etc.).

In one preferred embodiment, the vehicle is a truck such as an International 4300 SBA 4×2 truck. According to one exemplary embodiment, the vehicle includes an IHC MaxxforceDT engine with an output of 255 HP and 660 lbs. of torque. The vehicle further includes an Allison 3500_RDS_P automatic transmission. The vehicle has a front gross axle weight rating (GAWR) of 14,000/12,460 lbs., a rear GAWR of 19,000/12,920 lbs., and a total GAWR of 33,000/25,480. The vehicle includes a hydraulic boom in one embodiment. The vehicle boom has a working height of approximately 54.3 feet, a horizontal reach of 36.0 feet, an upper boom has an extension of approximately 145 inches. The lower boom may travel between approximately 0 degrees and 87 degrees from horizontal. The upper boom may have a travel between approximately −20 degrees and 76 degrees from horizontal. According to an exemplary embodiment, the vehicle may further include a hydraulic platform rotator, a hydraulic articulating jib and winch (e.g., with a capacity of 1000 lbs.), a hydraulic jib extension, hydraulic tool outlets, an on-board power charger providing 5 kW at 240 VAC, and electric air conditioning with a capacity of 5,000 BTU. The above referenced vehicles, transmissions, power, boom, and types of components are exemplary only.

System 10 includes a first prime mover 20 (e.g., an internal combustion engine, such as a diesel fueled engine, etc.), a first prime mover driven transmission 30, a component 40 (e.g., a power take-off (PTO), a transfer case, etc.), a second prime mover 50 (e.g., a motor, such as an electric motor/generator, a hydraulic pump with a thru-shaft, etc.), and an accessory 60 (e.g., a hydraulic pump, such as a variable volume displacement pump, etc.). In certain embodiments, accessory 60 can act as a third prime mover as described below. Transmission 30 is mechanically coupled to component 40 which is optional. Second prime mover 50 is coupled to accessory 60.

Interface 41 is disposed at a point between transmission 30 and prime mover 20. Interface 41 is preferably a bi-directional mechanical interface between second mover 50 and the point between mover 20 and transmission 30. Interface 41 can be various types of mechanisms for transferring power. Interface 41 is optional. As discussed above system 10 can have mover 50 coupled to component 40 as opposed to interface 41 in certain embodiments.

Interface 41 can be coupled between optional clutches disposed between mover 20 and transmission 30 as discussed with reference to FIGS. 2 and 3. In one embodiment, interface 41 is at a point before the transmission gear associated with the PTO or component 40 of transmission 30. In one embodiment, interface 41 can be a gear or similar device that interfaces with the crankshaft associated with prime mover 20 or a gear on a flywheel associated with prime mover 20.

Interface 41 can use gears, shafts, belts, or chains to engage second prime mover 50 to mover 20 and transmission 30. In one embodiment, a gear can be provided on the flywheel associated with mover 20. The flywheel can be on a front face of the housing of transmission 30 in one embodiment. The housing can be coupled to prime mover 20 in one embodiment.

The gear can be attached to a shaft which is in communication with the shaft of second prime mover 50 (e.g., via a pinion) in one embodiment. The gear can be designed to take additional torque (e.g., reinforced) over a conventional starter gear. In another embodiment, a starter gear on the flywheel may be utilized to provide interface 41. The gear can also be configured for continuous operation between mover 20, transmission 30 and mover 50.

In another embodiment, the gear is disposed on a crank shaft of prime mover 20 using a shaft and pinion in one embodiment. A clutch may be located between the pinion gear and the mover 50. In one embodiment, a shaft may connect mover 50 to the pinion. Optionally, the mover 50 or the pinion may have additional gears to allow mover 50 to rotate much faster than prime mover 20.

A gear or gear reduction set may be disposed between second prime mover 50 and accessory 60 in order for second prime mover to rotate much faster than accessory 60 in one embodiment. Accessory 60 can be a pump, blower, or other device requiring power but unable to rotate as fast as the second prime mover 50. The use of a shaft to directly or indirectly couple second prime mover 50 to pinion allows for additional packaging options. Second prime mover 50 may be an electric motor with a larger diameter that is better positioned behind or in front of the pinion or gear. Alternatively, prime mover 50 can be coupled to component 40 as described in the applications incorporated herein by reference.

Other advantages of positioning second prime mover 50 in a position that is not concentric with the crank shaft, include better control of the gap between the rotor and the stator. Further, second prime mover 50 is not subject directly to vibrations of the crank shaft, easier liquid cooling is enabled, and accessory 60 can be directly driven without incurring the parasitic losses associated with moving transmission 30 to operate a transmission-mounted PTO due to a non-concentric arrangement. An optional clutch located between second prime mover 50 and the pinion also permits second prime mover 50 to be disconnected from drive train when second prime mover 50 is not needed, thereby avoiding parasitic losses associated with rotating second prime mover 50 mounted around the crankshaft (in a concentric to crankshaft embodiment).

In another embodiment, interface 41 can utilize a ring gear, such as a ring gear utilized with a mixer which is continuously driven. The mixer can be a hydraulically powered mixer which is continuously driven. Alternatively, the ring gear can drive a variable flow pump. The use of the ring gear as interface 41 provides flexibility with respect to packaging and space which can be advantageous during retrofitting.

In one embodiment, the configuration using interface 41 expands the use of hybrid 10 system to numerous types of transmissions (automatic, manual, auto shift, CVT, etc.). By using a coupling between interface 41 and mover 50, it is not necessary to imbed mover 50 into the bell housing of the fly wheel, thereby reducing needed width between mover 20 and transmission 30. Interface 41 can be installed in an existing vehicle by replacing the gear on the crank shaft or fly wheel with a gear and linkage for coupling to mover 50.

Second prime mover 50 can also perform damping functions to offset the changes in angular velocity of the crankshaft that result in rough operation of the vehicle and transmission 30 in one embodiment. Prime mover 20 at low rpm can operate in a manner that results in high angular acceleration of the crankshaft as it rotates due to rough low speed operation of prime mover 20. Prime mover 20 can also employ cylinder deactivation to reduce fuel consumption at low loads, contributing to rough operation and higher frequency changes in the angular velocity of the crankshaft. By operating second prime mover 50 out of phase of accelerations created by prime mover 20, crank shaft can rotate smoother in one embodiment.

Other methods of operation of second prime mover 50 can provide electromagnetic damping. Such methods include but are not limited to control of torque of second prime mover 50 so that second prime mover 50 machine torque is out of phase of the prime mover engine torque ripple. A Li-ion battery system, or battery system with capacitor and/or ultra-capacitor may be utilized to store bursts of energy created as prime mover 20 accelerates second prime mover 50 during different phases of rotation. Rechargeable energy storage system 70, such as a battery, capacitor and/or ultra-capacitor system, can discharge energy to second prime mover 50 to accelerate prime mover 20 smoothing the rotation of crank shaft. The connecting shaft between the pinion and second prime mover 50 or the pinion gear itself may also or alternatively utilize mechanical means of damping, thereby reducing torsional vibration.

The use of mechanical damping methods on a shaft between a PTO and second prime mover 50 may also be used in other embodiments. Such methods may use a Lovejoy coupling, or other means to dampen torsional vibration and/or torque ripples. Same or similar means of vibrational damping may be used between other components in system 10, including but not limited to the interface between second prime mover 50 and accessory 60 in one embodiment, especially a compressor accessory and second prime mover 50 or the clutch disposed between second prime mover 50 and accessory 60.

A crank integrated starter/generation (C-ISG) configuration can be advantageous in one embodiment because one electric machine can be used to start the engine, to propel the vehicle, and to function as generator. In one embodiment, a crankshaft integrated starter generator C-ISG with the e-machine stator and rotor concentric to the crankshaft, can cause transmission 30 to be mounted further aft of prime mover 20. This configuration also does not necessarily allow the e-machine to directly power accessory 60 mounted via shaft (or directly) to second prime mover 20. A single clutch (e.g., clutch 52 in FIG. 3) can disconnect the e-machine from the crankshaft in a non-concentric configuration in comparison to a motor mounted concentric to the crankshaft configuration which would require two clutches in one embodiment. In one embodiment, auxiliary functions such as lubrication and HVAC are operated via energy from power source 70 to prevent wear and on/off cycling as mover 20 is started and stopped.

Mover 50 can be an electric motor such as an integrated starter/generator (ISG) in one embodiment. The ISG can be located at the location of a conventional starter.

According to one exemplary embodiment, second prime mover 50 is a 50 kW electric motor. The electric motor is preferably housed outside of the transmission/engine interface in one embodiment, thereby allowing more space for connection to accessory 60. When acting as a generator, second prime mover 50 may generate 30 kW continuously or as much as 75 kW at peak times. The above referenced power parameters are exemplary only. Second prime mover 50 may be further used to power various on-board components such as compressors, water pumps, cement mixer drums, etc.

In a preferred embodiment, accessory 60 is embodied as a hydraulic motor and includes a through shaft coupled to receive and provide power to interface 41 or mover 50. The through shaft can also be coupled to the shaft of the mover 50 embodied as an electric motor. In another embodiment, electric motor includes a through shaft that is coupled to the pump (e.g., accessory 60). Alternatively, linkage can be attached to the starter gear associated with mover 20. In another embodiment, a packaged fly wheel can replace the existing fly wheel. The packaged fly wheel includes gears and linkage for coupling to mover 50.

According to one embodiment, system 10 also includes a first rechargeable energy source 70 (e.g., a battery, a bank of batteries, a fuel cell, a capacitive cell, or other energy storage device), an Auxiliary Power Unit (APU) 80 (e.g., an internal combustion engine, possibly fueled by an alternative low emission fuel (e.g., bio-mass, natural gas, hydrogen, or some other fuel with low emissions and low carbon output), and a generator, a fuel cell, etc.), a second rechargeable energy source 90 (e.g. a hydraulic accumulator, ultra capacitor, etc.), and onboard or external equipment 100 (e.g., hydraulically operated equipment, such as an aerial bucket, etc.). First rechargeable energy source 70 is coupled to second prime mover 50 and provides power for the operation of second prime mover 50. First rechargeable (e.g., pressurized or rechargeable) energy source 70 may include other auxiliary components (e.g., an inverter provided for an AC motor, a DC-to-DC converter to charge a DC system, an inverter for power exportation to a power grid or other equipment, controllers for motors, a charger, etc.). APU 80 is coupled to first rechargeable energy source 70 and provides power to first rechargeable energy source 70. According to one exemplary embodiment, second renewable energy source 90 is a hydraulic system with a high pressure portion (e.g., an accumulator) and a low pressure component (e.g., a reservoir tank). In another exemplary embodiment, second renewable energy source 90 is a tank for storage of gas or fluids, such as a tank to store pressurized air. Accessory 60 may be any type of pump or compressor to pressurize or supply gas or fluid to the tank.

Second rechargeable energy source 90 is coupled to accessory 60 and provides stored power for accessory 60. Onboard or external equipment 100 can be coupled to accessory 60 or second rechargeable energy source 90 and operate using power from either accessory 60 or second rechargeable energy source 90. In one embodiment, onboard or external equipment 100 is coupled through second rechargeable energy source 90 to accessory 60. According to various exemplary embodiments, APU 80 may also provide power to both second renewable energy source 90 and first rechargeable energy source 70 when high hydraulic loads are required. APU 80 and second renewable energy source 90 may both provide power to hydraulically operated equipment 100.

Figure 2:
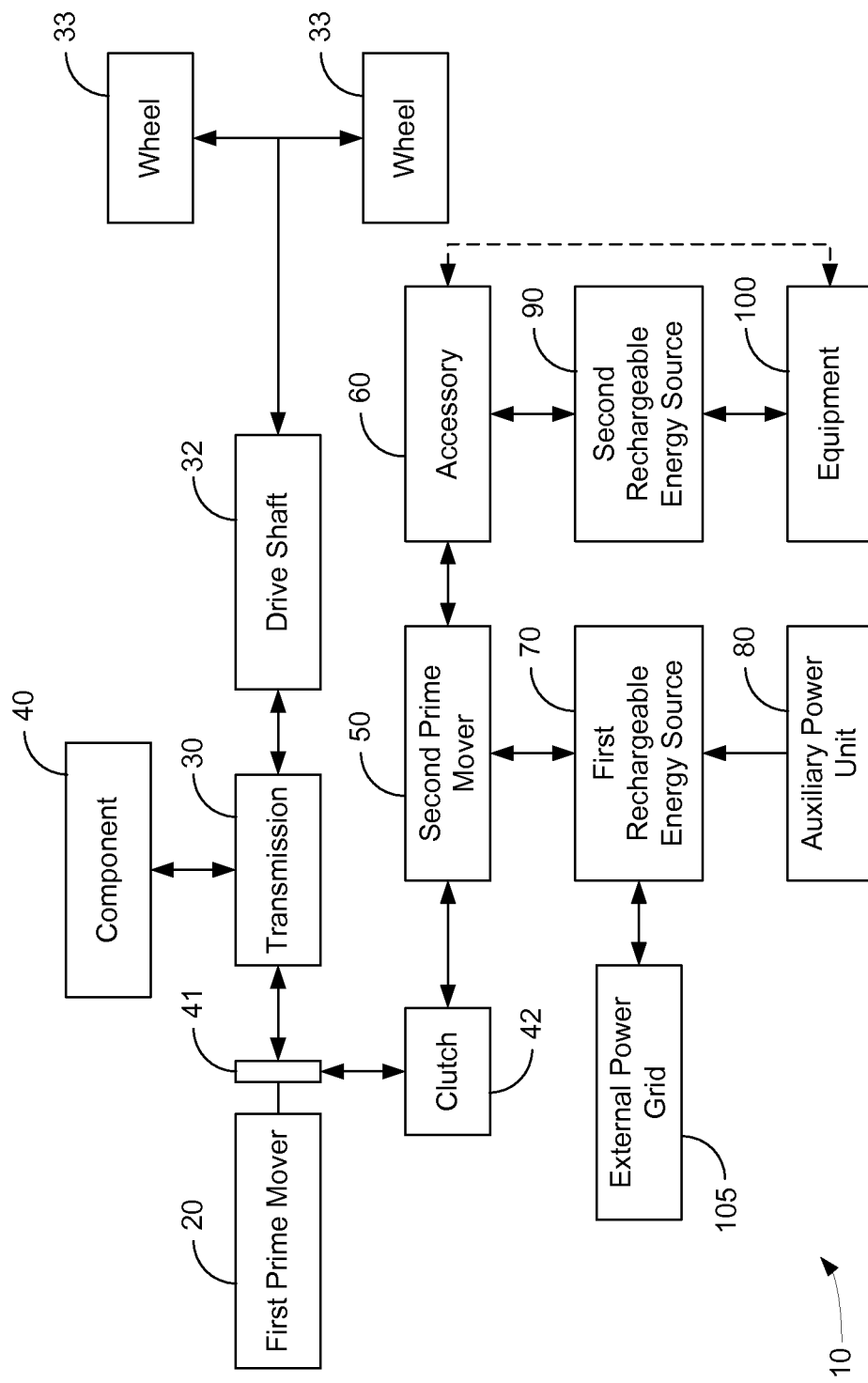
FIG. 2 is a general block diagram of a hybrid vehicle drive system according to another exemplary embodiment.
Figure 3:
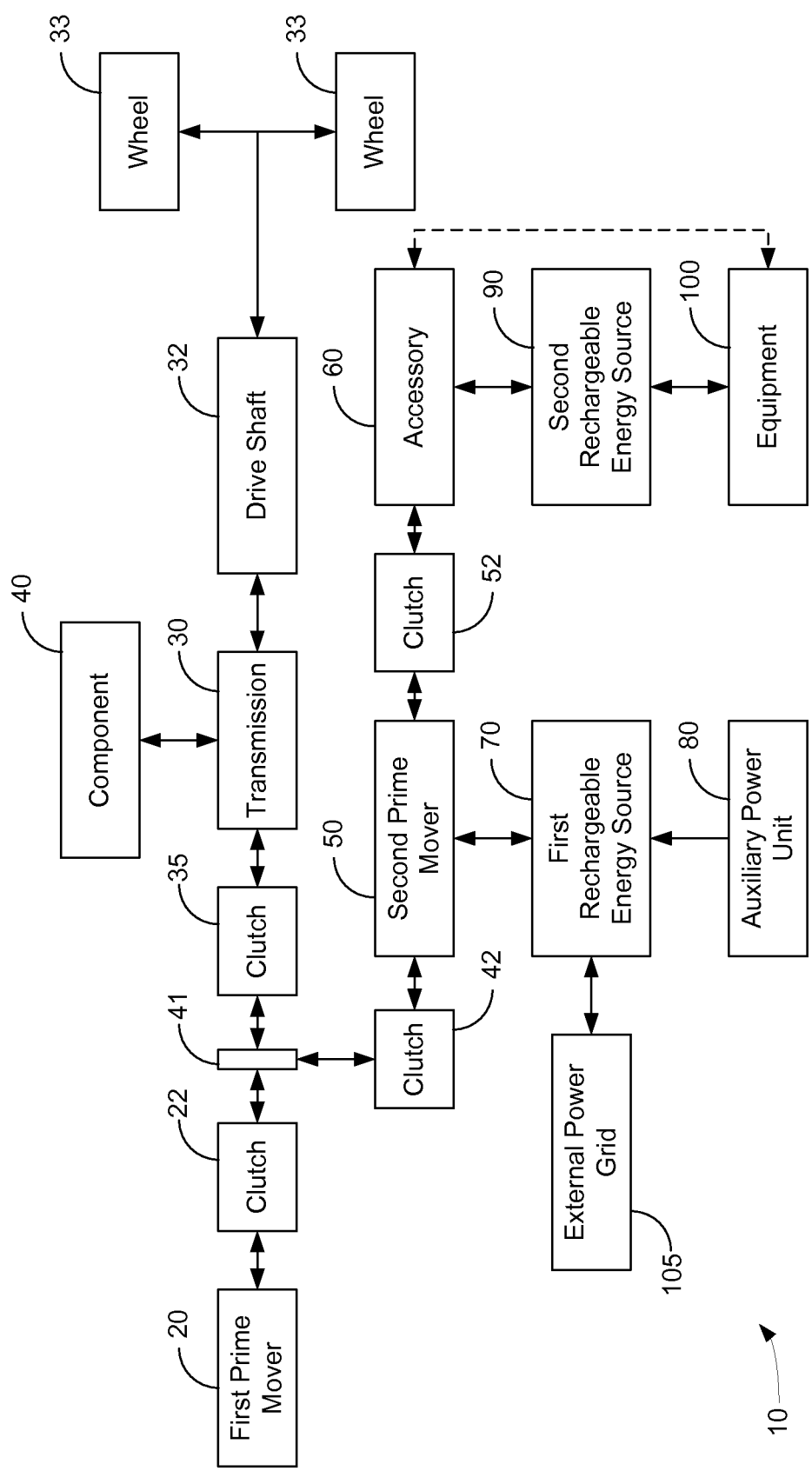
FIG. 3 is a general block diagram of a hybrid vehicle drive system according to another exemplary embodiment.

In one embodiment with reference to FIGS. 2 and 3, interface 41 is designed to be engaged or disengaged via clutch mechanisms or clutches 22, 35 and 42. Clutches 22, 35 and 42 are optional, one or more of the clutches may not be installed in the system. With reference to FIG. 2, system 10 includes a clutch 42 disposed between prime mover 50 and interface 41. With reference to FIG. 3, a clutch 35 is disposed between interface 41 and transmission 30. In addition, a clutch 22 can be disposed between interface 41 and first prime mover 20. The use of clutches 22, 35 and 42 allow components to be driven without driving additional portions of system 10 or the vehicle. For example, in idle reduction modes, prime mover 50 can drive accessory 60 without driving interface 41, first prime mover 20 or transmission 30 by disengaging clutch 42. Similarly, prime mover 20 can drive prime mover 50 and be disengaged from transmission 30 via clutch 35. Use of clutch 22 allows prime mover 50 to drive transmission 30 without driving prime mover 20. A clutch 52 can be optionally disposed between mover 50 and accessory 60 to engage and disengage accessory 60. In one embodiment, the placement of mover 50 and accessory 60 can be exchanged.

In one alternative embodiment, second prime mover 50 can be placed on one side of a clutch (i.e. toward mover 20) and accessory 60 can be on the other side of a different clutch (i.e. toward transmission 30). Shafts may connect the prime mover 50 and accessory 60 to the clutches. Gears maybe used along with the shafts to multiply the speed of the prime mover 50 and/or accessory 60. Prime mover 50 may operate more efficiently at a higher RPM than first prime mover 20 and/or accessory 60. A potential advantage of this configuration is the easier use of an end mount electric motor (rather than a thru shaft motor). End mount motors are typically easier to source (i.e. find and procure) and can be less expensive. Similarly, end mount accessories are easier to obtain and typically less expensive. A single housing for the mechanical interface to interface 41 and the clutches could be made. Optional support for the housing may be provided by the bell housing, end of transmission 30 or some other structure related to prime mover 20 or transmission 30.

Interface 41 can be directly coupled to mover 20, and transmission 30 in one embodiment. Alternatively, interface 41 may interface with transmission 30 in a way that directly couples interface 41 to a torque converter of transmission 30. The torque converter may be in mechanical communication with mover 20, but rotating at a different speed or may rotate at the same speed as mover 20 if it is locked up.

With reference to FIG. 2, interface 41 can be disengaged from transmission 30 via a clutch 42 when first prime mover 20 exceeds the maximum operating RPM of any component connected through clutch 42. For example, clutch 42 or 52 can disengage mover 50 if first prime mover 20 exceeds the maximum operating RPM of accessory 60. Alternatively, all components connected through interface 41 can operate throughout the RPM range of first prime mover 20, and interface 41 can be engaged continuously. In a preferred embodiment, component 40 can be disengaged during high speed steady driving conditions to reduce friction and wear on system 10 from mover 50 by clutch 22. Upon optional reengagement of second prime mover 50, which may be initiated due to braking and/or speed dropping below a threshold, second prime mover 50 may be powered so that the rotational speed (rpm) at the clutch interface equals or is close to, the rpm of the other side of the clutch, so that upon engagement, wear on the clutch is minimized and first prime mover 20 and transmission 30 do not experience a change in RPM due to a momentary extra load caused by engagement of the clutch. A control system 14 discussed in U.S. application Ser. No. 13/812,373, incorporated herein by reference or VMCS 6 discussed in U.S. application Ser. No. 12/217,407 incorporated herein by reference can control the rotational speed of prime mover to effect that minimization of change in RPM.

In FIG. 1, first prime mover 20 provides power to drive shaft 32 through transmission 30. Second prime mover 50 provides additional or alternative power to drive shaft 32 through interface 41 and transmission 30. Drive shaft 32 provides power to two or more wheels 33 used to provide forward and backward momentum to the vehicle. For example, second prime mover 50 can optionally provide the sole source of power to drive shaft 32. Alternatively, second prime mover 50 can provide additional power to drive shaft 32 during vehicle acceleration. When providing power to drive shaft 32, second prime mover 50 can operate using power from first rechargeable energy source 70. According to the various exemplary embodiments of system 10, first rechargeable energy source 70 can be charged or powered by second prime mover 50, APU 80 or another suitable source (e.g., the vehicle alternator, the power grid, etc.).

Figure 8:
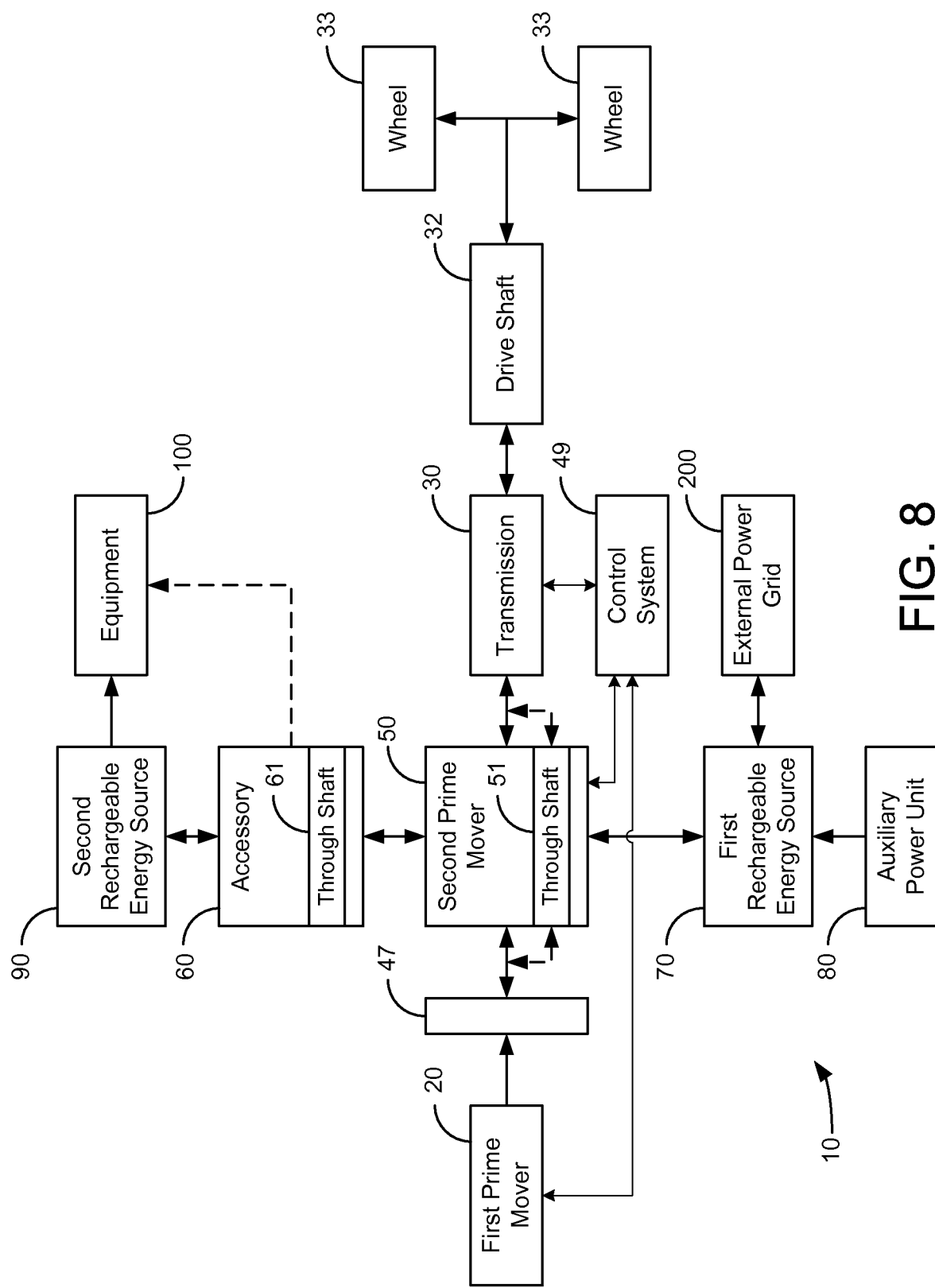
FIG. 8 is a general block diagram of a hybrid vehicle drive system according to another exemplary embodiment.

The use of prime mover 50 to provide power through interface 41 while interface 41 is engaged to prime mover 20 allows reduction in fuel consumption by mover 20 during operation as described below. In another embodiment, the use of prime mover 50 to provide power through component 40 (e.g., PTO) to mover 20 allows a reduction in a fuel consumption by mover 20 during operation as described below. In another embodiment, system 10 can be configured as shown in FIG. 8, and prime mover 50 between transmission 30 and prime mover 20 can provide power to mover 20 to reduce fuel consumption as described below. In yet another embodiment, system 10 can be configured in a hybrid series configuration and prime mover 50 can provide power to mover 20 to reduce fuel consumption as described below. For example, when vehicle 10 is stopped, power from second prime mover 50 or accessory 60 can increase the revolution per minute (RPMs) associated with prime mover 20, or can cause a reduction in needed torque of prime mover 20 if the RPM is at, or just slightly above, the RPM that the engine has been commanded to operate by a control system, such as an engine control module and/or transmission control module. Such an increase in the RPM of prime mover 20 results in reduction in fuel provided to prime mover 20, as a result of commands provided by the electronic control module (ECM) of vehicle 10, or commands provided by other control systems interfacing with prime mover 20. The reduction in fuel may be in response to the engine control system initiating de-fueling to try to slow the RPM of the engine. As an example, a similar reduction in fuel input into prime mover 20 may occur if the vehicle is going downhill and transmission 30 causes prime mover 20 to operate at a higher RPM. In response to the higher RPM of prime mover 20, the control system for prime mover 20 may command a reduction in power of prime mover 20, which results in a reduction or elimination of fuel used by prime mover 20. The reduction or elimination of fuel used by the prime mover 20 may be due to a reduction or elimination of the fuel supplied to the prime mover 20 by any of a change in operation of a fuel pump, fuel injector, valve, or other means. In spark ignited prime movers, the spark may also be turned off. In some cases, the transmission control module may send commands to the engine control system causing, enabling or commanding a reduction in fuel use by prime mover 20. The increased RPM is preferably controlled to be below a threshold so that drive shaft 32 does not begin forward operation in response to the increased RPM. In such configuration, system 10 advantageously reduces engine idle fuel consumption without requiring significant changes to the vehicle. Prime mover 20 may idle with cylinder deactivation technology. The deactivation of combustion in certain cylinders of an internal combustion engine may cause changes in rotational speed of the crank shaft, resulting in a rough idle. Use of second prime mover 50 to apply power to prime mover 20 may allow the engine to operate in a cylinder deactivation mode, saving fuel, or may allow the prime mover 20 to totally eliminate fuel consumption under some modes of operation, such as idle, acceleration and/or sustained motion of the vehicle. If fuel use is totally eliminated during idle, the crankshaft may not experience the changes in velocity associated with cylinder deactivation, resulting in a smoother, less varied rotational speed of the crank shaft. System 10 can use control system 14 discussed in U.S. application Ser. No. 13/812,373, incorporated herein by reference or VMCS 6 discussed in U.S. application Ser. No. 12/217,407 incorporated herein by reference to effect the idle fuel reduction as explained herein. Bumping or raising the idle rpm of prime mover 20, or inputting more torque than required to operate or rotate prime mover 20, provides an advantageous way of reducing aggregate consumption by prime mover 20 when vehicle 10 is stopped. Once the vehicle accelerator is pressed, the ECM provides fuel to prime mover 20 so that vehicle operates according to normal operation. The ECM can also reduce fuel consumption during travel when prime mover 50 provides power during travel and prime mover 20 is also engaged.

Such an increase in the RPM of prime mover 20 results in reduction in fuel provided to prime mover 20, as a result of commands provided by the electronic control module (ECM) of the vehicle, or commands provided by other control systems interfacing with prime mover 20. In some cases, the transmission control module may send commands to the engine control system causing, enabling or commanding a reduction in fuel use by prime mover 20. A controller, such as a hybrid control unit could send signals to the transmission controller and/or engine controller causing, enabling or commanding a reduction in fuel use by prime mover 20. Such signals may be torque requests sent by a master controller, or multiple controllers, to the first prime mover 20 and second prime mover 50, such that the sum of the torques from each mover meets required torque input into the transmission. Controllers monitoring the first prime mover 20 and second prime mover 50 may communicate bi-directionally with the master controller to communicate available torque from each prime mover. The method of summing torques was described in patent application 61/251,285 incorporated herein by reference and is especially beneficial in managing torque outputs so that the maximum turbine torque limit of an automatic transmission is not exceeded. The control system may adjust torque requests to each prime mover to minimize fuel consumption and emissions while meeting overall power and vehicle performance requirements. The hybrid controller can also communicate with transmission controller and/or engine controller to cause, enable or command the starting and stopping of prime mover 20, such as when the truck is stationary at a stop sign or signal or other event in which stopping prime mover 20 would be beneficial. Prime mover 20 may optionally be stopped in such a way or position as to more easily start the prime mover 20 after it has stopped. Such a method may optionally position crank shaft and cylinder position so that prime mover 20 may be started more easily, more quickly or instantly by injecting fuel into the cylinder. Prime mover 20 may be started using hybrid electric motor (e.g., mover 50) and may immediately begin consuming fuel to provide propulsion, or may initiate movement only using energy from rechargeable energy source 70 and then initiate combustion within prime mover 20 at a later time to transition to a blended mode of propulsion using both movers 20 and 50 upon an input for additional power or at a certain speed, or some other event. The hybrid controller could then command the hybrid system to provide no mechanical input above a certain speed, such as highway cruising speed as an example and may optionally disengage second prime mover 50 as described in the patent applications incorporated herein by reference to reduce the parasitic loads on the powertrain at high speed. The hybrid system may optionally synchronize second prime mover 50 with prime mover 20 and then reengage the mechanical interface when it can provide benefits such as the recapturing of brake energy or additional propulsion.

According to one embodiment, prime mover 20 can have idle speed control built into the ECU of mover 20. Idle speed is the rotational speed of mover 20 when the engine is uncoupled to the drivetrain and the throttle pedal is not depressed (generally measured in revolutions per minute, or rpm, of the crankshaft) of a combustion engine in certain embodiments. Setting the idle speed too slow can result in very low oil pressure when the engine is hot, resulting in faster wear and possible seizure. At idle speed, mover 20 generates enough power to run reasonably smoothly and operate its ancillaries (water pump, alternator, and, if equipped, other accessories such as power steering), but usually not enough to perform useful work, such as moving an automobile or truck in one embodiment. For a passenger-car engine, idle speed is customarily between 600 RPM and 1,000 rpm in some embodiments. For buses and trucks it is approximately 540 RPM or can be higher, such as 750 RPM, in some embodiments. The RPM of mover 20 is monitored by the crankshaft position sensor which plays a primary role in the engine timing functions for fuel injection, spark events, and valve timing.

Idle speed can be controlled by a programmable throttle stop or an idle air bypass control stepper motor in one embodiment. According to some embodiments, a carburetor-based prime mover 20 can use a programmable throttle stop using a bidirectional DC motor. Alternatively, throttle body injection (TBI) systems can use an idle air control stepper motor. Effective idle speed control anticipates the engine load at idle. Changes in this idle load may come from HVAC systems, power steering systems, power brake systems, and electrical charging and supply systems. Engine temperature and transmission status, and lift and duration of camshaft also may change the engine load and/or the idle speed value desired. Second prime mover 50 or a controller associated therewith can receive feedback associated with increased loads and increase speed to ensure that mover 20 is rotated at a speed above the speed where fuel is provided to mover 20, or provide sufficient torque to mover 20 such that prime mover 20 does not use any fuel to rotate and/or to operate. The feedback can be provided from sources including the ECM, bidirectional DC motor, stepper motor, injector systems, HVAC systems, etc.

In one embodiment, a full authority throttle control system may be used to control idle speed, provide cruise control functions and top speed limitation. If mover 20 is operating a large number of accessories, particularly air conditioning, the idle speed can be raised to ensure that mover 20 generates enough power to run smoothly and operate the accessories. An air conditioning-equipped vehicles 10 can have an automatic adjustment feature in the carburetor or fuel injection system that raises the idle when the air conditioning is running in one embodiment. In such situations, the control system can use the signal from the air conditioning system to increase the speed of prime mover 50. Alternatively, if the accessories that are driven by movement of first prime mover 20 can be operated at lower RPM, prime mover 50 may cause prime mover 20 to rotate at a speed that is below the RPM normally associated with the RPM of first prime mover 20 when fuel is used to idle prime mover 20. Such operation may require commands from the powertrain and/or engine control system to reduce or stop fuel flow during lower rpm mode of operation. Operating at a lower rpm may reduce the amount of energy needed to rotate first prime mover 20, allowing more energy in rechargeable energy source 70 to be used for propulsion or powering of other equipment, thereby increasing overall efficiency.

The exemplary embodiment can be used with any of the hybrid systems 10 described herein or in the patent applications incorporated herein by reference. For example, the embodiment can use an interface through the PTO to an Allison transmission ("live" PTO that is coupled to the crank shaft through transmission 30) or through an interface 41 with prime mover 20 (or in between prime mover 20 and transmission 30). Alternatively, the described method could be used by a powertrain having an integrated starter generator or other device to supply power to prime mover 20. The method might be used on any light-duty, medium-duty, heavy-duty, off-road vehicle or other vehicles and stationary power systems.

An exemplary operation is described below; other methods can also be used and not divert from the claims of the patent application. When the vehicle is traveling at highway speed of 65 mph, second prime mover 50 may be coupled to transmission 30 and provide propulsion assist (putting power into transmission 30) and/or provide regenerative braking (receiving power from transmission 30) dependent upon driver inputs and/or other inputs to the hybrid control unit and/or another control units of vehicle such as a transmission controller and/or engine controller. The vehicle may alternatively be traveling at highway speed of 65 mph and second prime mover 50 may be disengaged from transmission 30 or other interface with vehicle's crankshaft or driveshaft in order to reduce parasitic energy losses. The vehicle traveling at 65 mph may initiate regenerative braking upon a reduction in the request for power as detected by monitoring the position of the accelerator pedal, or through other means. If the accelerator pedal moves down, system 10 can use this along with other inputs to command second prime mover 50 to provide propulsion assist. Propulsion assist may be limited to a certain range of speeds. If the accelerator pedal moves up, system 10 can use this input along with other inputs to command the second prime mover 50 to provide regenerative braking. The hybrid controller or other controllers may command the transmission to retain torque converter lock-up, or other functions that control clutches within and/or external to the transmission to improve the effectiveness of regenerative braking.

As the vehicle slows, the transmission can be downshifted manually or through the commands of a controller (hybrid, transmission, engine and/or some other controller) to optimize the gear selection for the speed of the vehicle and other factors, such as load and/or driving preference (power or efficiency). As the vehicle slows, the ECM (Engine Control Module) or other controllers may command the reduction or total elimination of fuel flow to the engine (mover 20). Once the vehicle is stopped, or is below a certain speed (example 5 mph), second prime mover 50 may be operated to either receive or provide power to the crankshaft of prime mover 20 in order to maintain the desired rpm of prime mover 20 with reduced fuel in comparison to the operation of prime mover 20 without a hybrid system, or second prime mover 50 may be operated to maintain the rpm of prime mover 20 with the elimination of fuel use by prime mover 20. Second prime mover 50 may be commanded to maintain the rpm of the prime mover 20 in order for accessories such as, but not limited to, power steering, braking, HVAC, oil pump and engine cooling to continue to operate without the consumption of fuel by prime mover 20. Second prime mover 50 may continue to provide power to the crankshaft of prime mover 20 during the duration the vehicle is stopped or the vehicle is operated at a reduced speed. Battery state of charge (SOC) and other diagnostics of the hybrid system may be monitored during the use of second prime mover 50, if the SOC drops below a defined threshold, the hybrid controller or other controller on the vehicle or combination of controllers may command prime mover 20 to operate using fuel and discontinue the use of prime mover 50. Alternately, the control system may command prime mover 20 and/or prime mover 50 to stop after a certain duration in which the vehicle has zero motion and the brakes are active. Transmission 30 may continue to stay in Drive during the aforementioned operating mode, or the control system (hybrid, transmission, ECM or combination or other) may command transmission 30 to be in neutral or in RELS (Allison mode of transmission operation, also referred to as reduced engine load at stop) to minimize the load on second prime mover 50 and/or prime mover 20 when the vehicle is stopped and the brake is applied. When the brake is released or moved up to a position of less brake force, the engine may be cranked using preferably prime mover 50 and/or a starter motor, if prime mover 20 is not already rotating at the desired rpm for low speed, idle operation. The vehicle may be commanded to continue to operate in an all-electric mode when the accelerator is depressed, indicating motion of the vehicle is desired. During this operation, the control system may command the fuel flow to the engine (prime mover 20) to be discontinued while second prime mover 50 operates to provide power to the crankshaft and may rotate the prime mover 50 to higher rpm depending upon the need for acceleration. Optionally, prime mover 20 may be operated at reduced fuel flow or normal fuel flow during acceleration or just before acceleration when the vehicle is stopped, but expected to begin to accelerate based upon changes to the inputs in the control system, such as the release of the brake and/or depressing the accelerator pedal. Once the vehicle has accelerated to a certain speed and/or the demand for power exceeds the capabilities of the power provided by prime mover 50 and/or the hybrid stored energy system has been depleted below a certain level, and/or another condition has been met, the control system may command prime mover 20 to use combustion to help move, or move the vehicle. This example is intended to demonstrate how the system can be operated to reduce fuel use during stopping and starting of vehicle motion. Other methods to reduce fuel can be used, such as using second prime mover 50 to increase the rpm of the engine above the idle set point of prime mover 20, so that the ECM or other controller discontinues or reduces fuel flow to the engine. Similarly, during acceleration, second prime mover 50 may be operated to exceed the commanded power from prime mover 20, resulting in reduced or discontinued fuel flow to prime mover 20. Optionally, if second prime mover 50 fails to provide the needed increase in RPM above idle set-points and/or commanded power of prime mover 20, the ECM may operate prime mover 20 by consuming fuel as normally commanded by the ECM. Such a method could allow prime mover 20 to operate normally if prime mover 50 fails or is not functioning. An optional brake override feature may be used to command second prime mover 50 to discontinue operation and/or for the hybrid system be disconnected from the transmission or crankshaft if the brake pedal is depressed below a certain level.

In order to lower emissions from the first prime mover, the method of operation of second prime mover 50 may be changed according to one embodiment. As an example, on a vehicle or stationary installation with a diesel engine (mover 20), the temperature of the exhaust from first prime mover 20 may need to be kept within a specific range to minimize harmful emissions. If the exhaust temperature is lower than or greater than the specified range, emissions may be elevated, or prime mover 20 and the emissions system may operate in such a way as to reduce overall efficiency but reduce emissions by dumping fuel into the exhaust in order to increase temperature in the after-treatment section. The control system of the hybrid may optionally monitor exhaust temperature and/or other diagnostic inputs from first prime mover 20 and the exhaust after-treatment of first prime mover 20. The inlet temperature of the diesel oxidation catalyst may be one of the parameters monitored. The control system then may cause second prime mover 50, which is coupled to the first prime mover in this mode of operation, to act as a generator in order to put the first prime mover under increased load. Placing additional load on first prime mover 20 causes the powertrain control system (ECM, or other) to increase the power output of the first prime mover 20 in order to maintain commanded RPM. The increased power output is typically associated with a rise in exhaust temperature, which may be desirable if exhaust temperatures were too low, such as shortly after a cold start or during operation under very low loads. Using the second prime mover 50 as a generator is beneficial since some of the energy used to improve exhaust emissions can be captured in the rechargeable energy source for later use to increase efficiency by reducing the need for fuel in other modes of operation. The use of second prime mover 50 as a generator powered by first prime mover 20 may occur during stationary and/or driving modes if used on a vehicle and maybe especially beneficial if the time to reach higher exhaust temperatures is reduced. The first rechargeable energy source 70 may optionally be recharged to a lower level than 100%, such as through grid recharging or other means, if it is anticipated that second prime mover 50 may be used as a generator soon after initiation of vehicle operation to accelerate or assist the process of reaching higher exhaust temperatures, especially during a cold start. The control system may continue to monitor exhaust temperatures and suspend or discontinue use of second prime mover 50 for the purpose of increasing exhaust temperatures if the temperature reaches the desired range. The system may also monitor exhaust temperature and adjust operation of second prime mover 50 in other modes of operation, such as during launch assist when both prime movers 20 and 50 are used to accelerate the vehicle, to maintain a sufficient load on first prime mover to minimize harmful emissions. This method may be particularly useful for diesel powered engines. The emissions generated by other fuels, such as some gaseous fuels, may be less adversely effected by exhaust temperature variations, and may be more suitable to stop/start operation of first prime mover 20. A supplemental device, such as an electrical heating element, to warm the catalyst or thermal insulation to better retain the heat within the catalyst may also be used to minimize the need for placing a load by second prime mover 50 on first prime mover 20. The method of operation of prime mover 50 and possibly of prime mover 20 may also be changed due to other factors, such as temperature of the passenger compartment and the possible need to provide heat. If an external or alternate heater is used, such as a fuel fired or electrical heater, the operation of prime mover 20, or use of fuel by prime mover 20, may not be needed to provide heat to the passenger compartment of the vehicle. If no alternative heater is available, prime mover 20 may be used and prime mover 50 may be operated to provide heat more quickly to passengers.

Optionally, transmission 30 can be controlled to reduce losses while stopped, such as the RELS (Reduced Engine Load At Stop) feature on an Allison transmission. The control system may verify that the brake is engaged (e.g. foot on brake, by monitoring brake pressure) before engaging RELS. If brake is released, the control system may make sure that transmission is not in RELS to prevent vehicle from moving backward on a hill.

One of the advantages to keeping prime mover 20 rotating without the use of fuel is that the oil pump continues to lubricate the engine. While system 10 could be used to stop and quickly start prime mover 20, the wear on prime mover 20 at start tends to be higher than at other operating modes. Moving prime mover 20 with second prime mover 50 and no fuel also continues to move transmission 30 (and transmission fluid pump) on an automatic transmission while continuing to power other important engine driven systems such as brakes, steering, HVACs, oil pump, etc.

When transmission 30 is in first range and this function is enabled, the ECM automatically commands transmission operation at a reduced load state which is similar to neutral in one embodiment. In one embodiment, conditions for enabling the function are:

vehicle is at a stop;
service brakes are applied; and
throttle position is low.

In one embodiment, RELS is disabled when the throttle is advanced, Drive is selected at the shift selector, or the request circuit is switched open—which will occur if the service brakes are released, the dash enable switch is opened, and/or an additional optional interlock (i.e. door switch) is opened. If an Automatic Neutral input function is enabled while RELS is in an active state, RELS will be disabled.

A service brake pressure switch can be included in the activation circuit for this function in one embodiment. The location of this switch can be critical to the disabling of RELS each time the service brakes are released during normal driving cycles in one embodiment (to minimize the potential for vehicle roll-back if the feature is activated when the vehicle is stopped on an incline). Optionally, the signal may be digital based upon release of the brake, as provided on a CAN bus or other communications method.

Preferably, system 10 reduces heat load in the transmission in high start/stop duty cycles, improved fuel economy by reducing engine load when the vehicle is at a stop, and provides a diagnostic interface.

Motor or mover 50 can be utilized to crank prime mover 20, raise or bump the idle, help accelerate and brake the vehicle. The optional clutch 52 between prime mover 50 and accessory 60 can be engaged if accessory 60 is continuously needed such as in a hydraulic powered mixer or when accessory 60 is a variable flow pump. Mover 50 can power accessory loads such as AC, brakes, steering, etc. using power from first regenerative source 70 in one embodiment. Powering accessory loads via mover 50 increases efficiency by removing loads from prime mover 20. Under some circumstances, the torque needed to power accessories using mover 50 may be estimated or monitored in order to more accurately determine the torque available to operate first prime mover 20 and/or transmission 30. The torque output of mover 50 may equal the sum of the torque required to input into prime mover 30 and/or transmission 30 (also accounting for possible losses in efficiency due to gears) along with the cumulative torque of accessories driven by prime mover 50.

Interface 41 can be a starter ring gear also known as a starter ring or ring gear. Prime mover 50 can be utilized as the starter motor to transfer power to the flywheel. The starter ring or ring gear can be attached to the periphery of a flex plate or flywheel of prime mover 20. The ring gear may utilize a different gear design and/or harder material to allow second prime mover 50 to provide more power or operate for much longer durations than a conventional starter motor.

In some embodiments, a second transmission fluid pump may be provided on the second prime mover 50 and may be activated to increase the flow of transmission fluid through component 40 and the second prime mover 50. The power to circulate transmission fluid to second prime mover 50 and operate the cooling system while the chassis is not being driven may be provided by an internal electric pump. According to an exemplary embodiment, component 40 could have an integrated pump. In such an embodiment, the transmission fluid pump is actuated by movement of second prime mover 50. The transmission fluid pump is moved by component 40 if second prime mover 50 is rotated by component 40. A second transmission fluid pump may be provided on second prime mover 50 and may be activated to increase the flow of transmission fluid through component 40 and second prime mover 50. Such increased flow may be advantageous.

Figure 4:
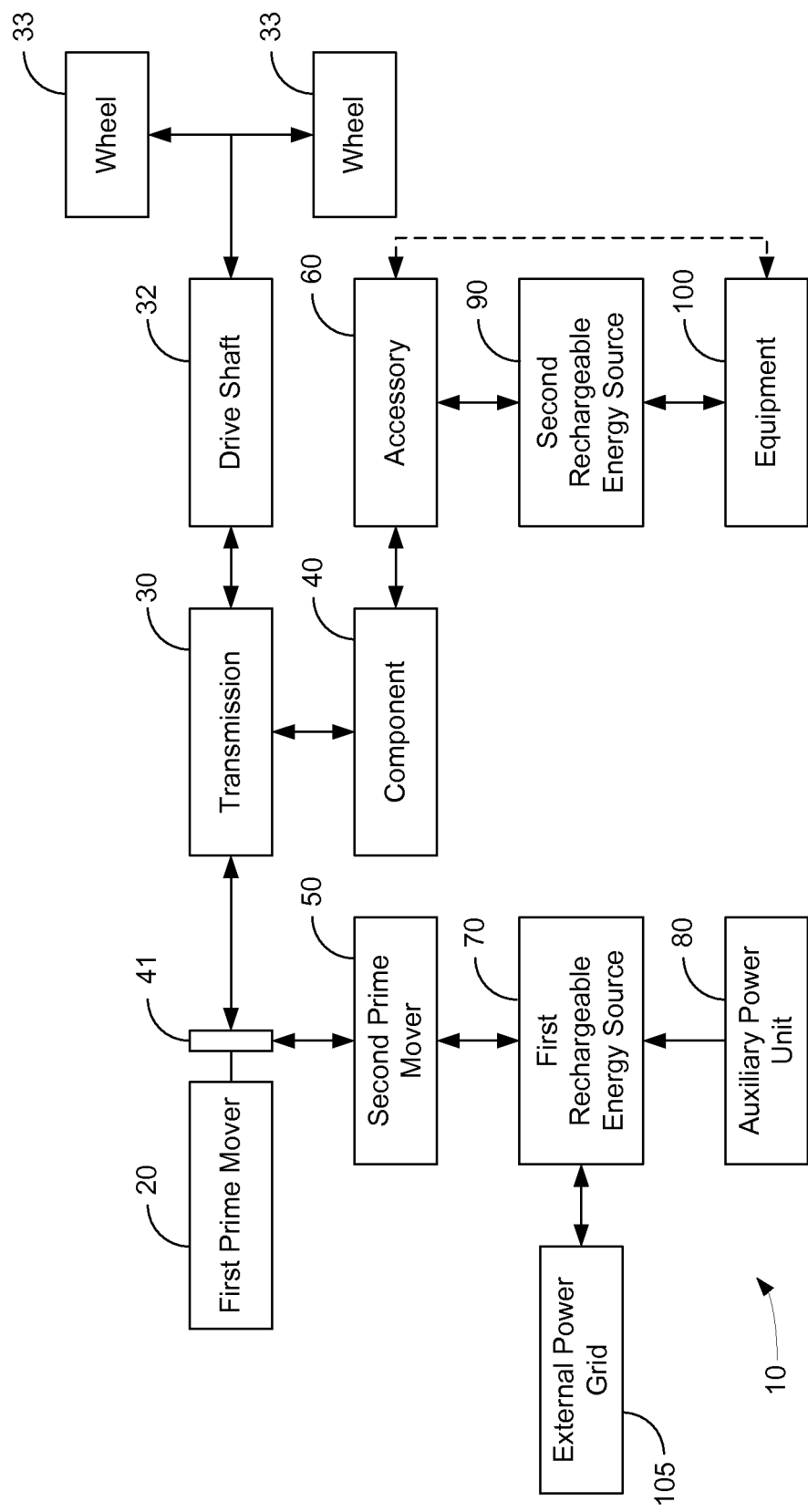
FIG. 4 is a general block diagram of a hybrid vehicle drive system according to still another exemplary embodiment.

With reference to FIG. 4, system 10 includes second prime mover 50 coupled to interface 41. However, accessory 60 is coupled to component 40 and driven through transmission 30 component 40 embodied as a PTO. Accessory 60 can be driven from prime mover via interface 41 or from prime mover 20. Alternatively, mover 50 can be coupled to component 40 with accessory 60.

Accessory 60 and prime mover 20 can be coupled through component 40 as a rear mounted PTO in one embodiment. The rear mounted PTO can be used as the input/output for energy from the various hybrid system combinations that are shown to work with the PTO on the transmission 30 in this application or any of the applications incorporated herein by reference. The rear mounted PTO embodiment is less dependent on transmission 30 and can potentially be used with a wide variety of transmissions. It is also not necessary to operate transmission 30 to operate component 40 (e.g., rear mounted PTO), so it should be more efficient (potentially less moving parts). If mover 50 is used as starter in this embodiment, an offset gear and shaft may be needed for packaging purposes. Also, a gear reducer may also be used in this embodiment if mover 50 is used a starter.

Optional APU 80 can be used to power first rechargeable energy source 70 when the vehicle is driving up a grade, as well as other situations. This use is intended to improve vehicle performance, particularly when the power requirements of the vehicle exceed the power available from first prime mover 20, first rechargeable energy source 70, and second rechargeable energy source 90. The presence of APU 80 is intended to allow for a smaller first prime mover 20. In one embodiment, APU 80 is of a type that produces lower emissions than first prime mover 20. APU 80 is intended to enable a vehicle using system 10 to meet various anti-idle and emission regulations.

In one embodiment, system 10 is configured to automatically engage APU 80 or first prime mover 20 through component 40 or accessory 60 to charge first rechargeable energy source 70 when the stored energy decreases to a certain amount. The permissible reduction in stored energy can be determined based upon a user selectable switch. The switch specifies the method of recharging first rechargeable energy source 70 from an external power grid.

In one embodiment, a user can select between 220-240V recharging, 110-120V recharging, and no external power source available for recharging. For the different voltages, the amount of power that can be replenished over a certain period of time (e.g., when connected to an external power grid overnight) would be calculated. Beyond that amount of power usage, first prime mover 20, or APU 80 is engaged to charge or provide power to first rechargeable energy source 70. If no external power source is available, first prime mover 20 or APU 80 can be automatically engaged during regular finite periods, calculated to minimize idle time. In one embodiment, APU 80 and/or optionally first rechargeable energy source 70 can provide power to an external power grid 200, also known as vehicle to grid (V2G) power sharing. This is intended to provide low-emission power generation and/or reduce requirements to generate additional grid power during peak loads on the grid.

In another embodiment, a user may only select between two settings, one setting to select charging using a grid and the other setting to select charging without using an external power grid. The controller would monitor state of charge of the batteries and control recharging differently for each setting. If no external charging from a power grid is selected, system 10 may allow the state of charge of first rechargeable energy source 70 (batteries) to drop to a threshold (as an example 30%), then the controller would cause either first prime mover 20 or the optional APU 80 to be engaged to charge batteries to a predetermined level (as an example 80%) to minimize the frequency that first prime mover 20 or APU 80 must be started. Or different levels of discharge and recharging may be selected to minimized idle time. System 10 can occasionally recharge batteries to 100% of charge to help condition the batteries. Optionally, system 10 can be operated so that batteries remain between a narrow range of state of charge in order to extend the life of the batteries, such as between 80% SOC and 50% SOC for example. If the user selectable switch indicated system 10 would be charged from an external power grid, the controller may allow the state of charge of first renewable energy source to drop to a threshold (as an example 30%), then the controller would cause either first prime mover 20 or optional APU 80 to be engaged to charge batteries to a predetermined level that is lower (as an example 50%). The lower level allows the external power grid to recharge a greater amount of first rechargeable energy source 70 when vehicle can be plugged in or charged by the external power grid, reducing the fuel consumption of prime mover 70 or optional APU 80. In another embodiment, a control system and/or algorithm is used to detect the likely use or absence of external grid power for recharging batteries. A variety of means can be used to predict with a higher degree of confidence whether the vehicle will be charged using external grid power. Previous history in the use of external charging may be considered, and/or the location of the vehicle, possibly during certain times, may be used with possible other inputs to predict whether the vehicle is likely to be recharged using external grid power. The operation of the hybrid system can then be optimized as described to maximize efficiency or other beneficial operational characteristics, such as maximum time with engine off while vehicle is working in a stationary position.

External power grid 200 allows first rechargeable energy source 70 to be recharged with a cleaner, lower cost power compared to recharging first rechargeable energy source 70 with first prime mover 20. Power from an external power grid may be provided at a fraction of the cost of power provided from an internal combustion engine using diesel fuel. According to one exemplary embodiment, first rechargeable energy source 70 can be recharged from an external power grid 200 in approximately 8 hours or less.

In one embodiment, second rechargeable energy source 90 is utilized, and provides power to accessory 60. Additional or alternative power can be provided to drive shaft 32 by accessory 60. For example, accessory 60 can provide power to drive shaft 32 until second rechargeable energy source 90 is discharged. Alternatively, accessory 60 can provide additional power to drive shaft 32 during vehicle acceleration. Accessory 60 provides power to drive shaft 32 through second prime mover 50, interface 41, and transmission 30. The combination of power provided to drive shaft 32 by second prime mover 50 and accessory 60 is intended to allow for the use of a smaller first prime mover 20 which provides the best use of stored energy and reduces the overall system mass. In another embodiment, accessory 60 only receives power from second prime mover 50 or from first prime mover 20 through component and does not provide power to drive shaft 32. Accessory 60 may power equipment directly.

In one exemplary embodiment, an optional clutch such as clutch 22 or clutch 42 can be coupled between first prime mover 50 and accessory 60. The clutch is disengaged when the vehicle is stationary so second prime mover 50 can turn accessory 60 without unnecessarily driving component 40.

A variety of control systems can be utilized to control the various components (clutches, motors, transmissions, etc.) in system 10. Electronic control systems, mechanical control systems, and hydraulic control systems can be utilized. In addition, a controller can be provided to indicate a request to operate an accessory or other equipment. In one embodiment, a controller similar to the controller in U.S. Pat. No. 7,104,920 incorporated herein by reference can be utilized. Preferably, the controller is modified to communicate by pneumatics (e.g., air), a wireless channel, or fiber optics (e.g., light) for boom applications and other applications where conductivity of the appliance is an issue.

The control system can utilize various input criteria to determine and direct the amount of power required or to be stored, the input criteria can input operator brake and acceleration pedals, accessory requirements, storage capacity, torque requirements, hydraulic pressure, vehicle speed, etc.

A control system can control the torque and power output of second prime mover 50 and accessory 60 so that component 40, second prime mover 50 and accessory 60 are operated within the allowable torque and power limitations of each item so that the sum of second prime mover 50 and accessory 60 do not exceed component 40 or exceed capacity of transmission 30, such as capacity of transmission power takeoff drive gear rating or exceed capacity of transmission maximum turbine torque on an automatic transmission. Optionally the controller may monitor and control additional input torque from the prime mover, or input torque of the prime mover after multiplication by the torque converter, along with that from other prime movers or accessories to ensure that the turbine torque limit is not exceeded or other internal torque ratings of components within an automatic transmission or an auto shift manual transmission, or a manual transmission. The torque and power output of second prime mover 50 and accessory 60 may also be controlled using an input from the driver and/or from a power train control system. If two components are used as described in other embodiments in U.S. application Ser. No. 12/710,247, the torque and power output of the second and third prime mover and optional accessory or accessories may be controlled so that the transmission power takeoff drive gear rating with two power takeoffs is not exceeded or that the capacity of transmission maximum turbine torque on an automatic transmission, or other toque rating of an internal component within a transmission of the same or different kind, such as, an auto shift manual or manual transmission, is not exceeded.

According to other exemplary embodiments, a control system can be used for other purposes (e.g., coupling component 40 to transmission 30; monitoring the charge status of first rechargeable energy source 70 and second rechargeable energy source 90; monitoring and managing the thermal status of various components (e.g., prime movers, rechargeable energy sources, electronics, etc.); operating first prime mover 20, second prime mover 50, and accessory 60 to replenish energy in first rechargeable energy source 70 and second rechargeable energy source 90 and/or supply power to equipment 100; operate APU 80 as needed; or control other functions). Information on the status of the system, such as operating efficiency, status of rechargeable energy sources, and certain operator controls may be displayed or accessed by the driver.

APU 80 charges or provides power to first rechargeable energy source 70 when necessary. APU 80 can include a generator powered by an internal combustion engine. The generator can be connected to first rechargeable energy source 70 through a power converter, AC/DC power inverter or other charging system. First rechargeable energy source 70 provides power to second prime mover 50. The operation of second prime mover 50 operates accessory 60. Accessory 60 provides power to on-board or external equipment 100. First rechargeable energy source 70 and/or APU 80 may provide all the power for system 10 when the vehicle is stationary and first prime mover 20 is turned off (e.g., in an idle reduction system). If second prime mover 50 is not coupled to drive shaft 32 and instead provides power to accessory 60 (e.g., in an idle reduction system), system 10 may include a simplified control and power management system.

According to another exemplary embodiment, first prime mover 20 may be operated periodically to provide power to second prime mover 50 through interface 41. Second prime mover 50 recharges first rechargeable energy source 70 and/or powers accessory 60. Accessory 60 can recharge second rechargeable energy source 90 or operate other equipment.

According to another exemplary embodiment, system 10 is configured as an idle reduction system that can provide power to vehicle loads such as HVAC, computers, entertainment systems, and equipment without the need to idle the engine continuously. Accordingly, system 10 uses an electric motor (e.g., prime mover 50) to power a hydraulic pump (e.g., accessory 60) for the operation of hydraulic equipment (e.g., aerial buckets, hydraulically powered compressors, etc.). Alternatively, the electric motor may directly power a compressor. The electric motor can be configured to only operate when there is a demand for hydraulic flow or the need to operate other mechanically coupled equipment to conserve energy within first rechargeable energy source 70. The electric motor can be activated by a controller that receives a signal sent through fiber optics or a signal sent through other means.

Batteries (e.g., rechargeable energy source 70) provide energy for the electric motor. After the batteries are depleted, an external power grid is used to recharge the batteries.

If the rechargeable energy reserve is large enough, the electric motor (mover 50) may operate continuously, eliminating the need for a controller to turn motor on and off based upon demand. Such a system may be coupled to a variable volume displacement pump to reduce flow when demand for hydraulic flow is low, resulting in lower consumption of power from the rechargeable energy source. This same method of continuous operation can also be used for hybrid system configurations.

Depending upon the battery system, the batteries may be thermally corrected during charging. Thermal correction may be needed if the temperature of the battery exceeds a certain threshold. A cooling system, either external to the vehicle or internal to vehicle may be used, such that coolant is circulated to reduce heat or the battery case can be ventilated with cooler air to dissipate heat, possibly with a powered ventilation system. A second pump may also be connected to a PTO. First prime mover 20 may be started and used to recharge by engaging component 40 to transmission and operating second prime mover 50 as a generator to recharge first rechargeable energy source batteries. If there is insufficient energy to operate the electric motor driven hydraulic pump, the vehicle engine is started, PTO engaged and the second pump is used to power the equipment. Further, the second pump can be used when the hydraulic power requirements exceed the power output of the electric motor coupled to the hydraulic pump. Alternatively, prime mover 50 could directly power the first accessory (hydraulic pump) and the second prime mover could be made not to operate as a generator. Not operating second prime mover as a generator may reduce system complexity and reduce cost.

In another embodiment, first rechargeable energy source 70 provides power to electrical systems of the vehicle such as "hotel loads" (e.g., HVAC, lighting, radio, various electronics, etc.). In yet another embodiment, first rechargeable energy source 70 charges a main crank battery of the vehicle. The main crank battery can be isolated from system 10. First rechargeable energy source 70 may also be used in other configurations that use 100% electric propulsion for certain periods to power additional vehicle systems such as power steering, brakes and other systems normally powered by first prime mover 20.

In yet another embodiment, second prime mover 50 provides power to external devices directly or through an additional rechargeable energy source and an associated inverter. Utilizing second prime mover 50 to power external devices is intended to lessen the need for an additional first prime mover 20 powered generator.

In yet another embodiment, a sophisticated control system (e.g., a pump control system utilizing fiber optics, etc.) can be used to control the operation of accessory 60. In yet another embodiment, accessory 60 is a variable volume displacement pump. Accessory 60 can operate continuously, only providing flow if there is a demand. When no demand is present, accessory 60 provides little or no additional friction or resistance within the system.

In one alternative embodiment, system 10 can be configured to only store energy (from regenerative braking and/or from engine) in source 70 and not provide launch assist. Such a system would simplify interaction with the power train and still save fuel by using stored energy to charge the lower voltage vehicle bus (i.e. 12 V, 24 V or 48 V) without having to rely significantly on the Front-end Accessory Drive system (FEAD) integrated generator (alternator). The FEAD generator (which is typically mounted on the front of the engine or mover 20 and coupled to the crankshaft via belts) consumes prime mover power. In this alternative embodiment, energy form source 70 can also be used at the jobsite.

Referring to FIG. 1, first rechargeable energy source 70 and/or APU 80 may provide power for system 10 when the vehicle is stationary and first prime mover 20 is turned off (e.g., in an idle reduction system). For example, energy source 70 may power accessory 60. In one embodiment, second rechargeable energy source 90 is utilized. Accessory 60 stores energy in second rechargeable energy source 90, as shown. Second prime mover 50 is engaged to operate accessory 60 (e.g., a hydraulic pump) when the stored energy in second rechargeable energy source 90 (e.g., a hydraulic accumulator) is reduced to a predetermined level. The utilization of second rechargeable energy source 90 is intended to reduce operation time of accessory 60. Accessory 60 only needs to operate to maintain energy in second rechargeable energy source 90. On-board or external equipment 100 (e.g., any hydraulic equipment) is powered by second rechargeable energy source 90. In one embodiment, a clutch mechanism is used to disengage accessory 60 from second prime mover 50 during vehicle travel when second rechargeable energy source 90 has been fully charged. This is intended to reduce friction on system 10 when second prime mover 50 is needed, but accessory 60 is not. Second rechargeable energy source 90 can provide hydraulic power to equipment 100 at a constant system pressure through a pressure reducing valve.

Alternatively, second rechargeable energy source 90 and two hydraulic motor/pump units are coupled together to provide constant system pressure and flow. The first unit (e.g., a hydraulic motor) receives high pressure flow from second rechargeable energy source 90. The first unit is coupled to a second unit (e.g., a pump) which supplies hydraulic power to equipment 100 at a lower pressure. Both hydraulic second rechargeable hydraulic circuit and low pressure hydraulic equipment circuit have a high pressure and a low pressure (reservoir or tank) sections. A control system may be utilized to maintain constant flow in the low pressure hydraulic equipment circuit as the high pressure flow from the second rechargeable source (accumulator) reduces or varies. The advantage of this configuration is that the energy from the high pressure accumulator is more efficiently transferred to the equipment. This configuration also allows independent hydraulic circuits to be used for the propulsion system and for equipment 100. The independent hydraulic circuits allow for fluids with different characteristics to be used in each circuit. Further, a hydraulic circuit that may be susceptible to contamination (e.g., the equipment circuit) can be kept separate from the other hydraulic circuit (e.g., the propulsion circuit).

In another embodiment, second rechargeable energy source 90 is utilized, and accessory 60 is a hydraulic pump. Second rechargeable energy source 90 can include a low pressure fluid reservoir and a hydraulic accumulator. The utilization of second rechargeable energy source 90 obviates the need for a sophisticated pump control system and the associated fiber optics; instead a simpler hydraulic system can be used (e.g., an insulated aerial device with a closed center hydraulic system and a conventional control system, etc.). If the speed of accessory 60 slows due to depletion of on-board power sources, accessory 60 can operate longer to maintain energy in second rechargeable energy source 90. This is intended to minimize any negative effects on the operation of equipment 100. According to one exemplary embodiment, second prime mover 50 is an AC motor and turns at generally a constant rate regardless of the output volume of accessory 60 (e.g., to create two or more different levels of flow from accessory 60).

However, in some scenarios, second prime mover 50 may provide power to accessory 60 and the speed of second prime mover 50 may be varied by a controller. For example, the speed of second prime mover 50 may be varied to reduce the flow of fluid from accessory 60 (e.g., for two speed operation of an aerial device where lower hydraulic flow may be desirable for fine movement of the boom).

In one embodiment, system 10 can provide the advantage of allowing a vehicle to operate at a work site with fewer emissions and engine noise by using an operating mode. In an operating mode, first prime mover 20 (e.g., an internal combustion engine, such as a diesel fueled engine, etc.) is turned off and interface 41 is disengaged via clutch 42 from transmission 30, power from first renewable energy source 70 and second renewable energy source 90 are used to operate on-board or external equipment 100 and electrical systems of the vehicle such as "hotel loads" (e.g., HVAC, lighting, radio, various electronics, etc.). According to another exemplary embodiment, second renewable energy source 90 may be optional and first renewable energy source 70 may directly power to equipment 100. According to one exemplary embodiment, first renewable energy source 70 has a capacity of approximately 35 kWh and is configured to provide enough power to operate the vehicle for a full day or normal operation (e.g., 8 hours).

Referring to FIG. 1 when APU 80 is out of fuel, APU 80 is not used, or APU 80 is not present, first rechargeable energy source 70 can be recharged by other components of system 10 (in addition to other methods). First prime mover 20 and second prime mover 50 are preferably operated and synchronized to the same speed (e.g., input and output mechanical communication through component 40 is a one-to-one ratio). First prime mover 20 provides power to second prime mover 50 through interface 41. Adjustments to second prime mover 50 speed is made if the ratio between first prime mover 20 and second prime mover 50 is not one to one to minimize wear of clutches associated with interface 41 or to speed of first prime mover 50. Operation of second prime mover 50 recharges first rechargeable energy source 70 to a predetermined level of stored energy. This method of recharging first rechargeable energy source 70 is intended to allow continuous system operation in the field without the use of external grid power. This method is further intended to allow continuous operation of equipment 100 during recharging of first rechargeable energy source 70.

While charging first rechargeable energy source 70, second prime mover 50 can simultaneously operate accessory 60. Accessory 60 provides power to on-board or external equipment 100. After first rechargeable energy source 70 has been recharged, component 40 is disengaged from transmission 30. Operation of accessory 60 can continue without the use of first prime mover 20. Alternatively, with interface 41 engaged, operation of accessory 60 can continue powered in part or in full by prime mover 20. This may be useful for example, if there is a failure in one of the other components that power accessory 60. This may also be useful if the power demand from accessory 60 exceeds the power available from second prime mover 50. According to one exemplary embodiment, first prime mover 20 provides supplementary power to or all of the power to equipment 100 (e.g. a digger derrick that may require higher hydraulic flow during digging operations). Using first prime mover 20 to provide supplementary power to equipment 100 during intermittent periods of high power requirement allows system 10 to include a smaller second prime mover 50 that is able to provide enough power for the majority of the equipment operation. The control system may receive a signal from the equipment indicating additional power is required beyond that provided by second prime mover 50. Such a signal may be triggered by the operator, by activation of a function (e.g., an auger release, etc.), by demand in the circuit or component above a predetermined threshold, or by other means.

Referring to FIG. 1, second rechargeable energy source 90 is utilized. Accessory 60 provides power to second rechargeable energy source 90. In one embodiment, on-board or external equipment 100 (e.g., hydraulic cylinders, valves, booms, etc.) is coupled to second rechargeable energy source 90, and can be powered by second rechargeable energy source 90. External equipment 100 may also be operated directly by accessory 60 without the use of a second rechargeable energy source 90. This method of recharging first rechargeable energy source 70 and second rechargeable energy source 90 is intended to allow continuous system operation in the field without the use of external grid power. This method is further intended to allow continuous operation of equipment 100 during recharging of first rechargeable energy source 70 and second rechargeable energy source 90.

Referring to FIG. 3, in one embodiment, clutch 22 or other mechanism is used to disengage first prime mover 20 from transmission 30 during vehicle braking. This is intended to maximize the regenerative energy available from vehicle braking. The forward momentum of the vehicle provides power from wheels 33 to transmission 30. Transmission 30 may be reduced to a lower gear to increase the RPMS and increase the amount of energy transferred to second prime mover 50. Second prime mover 50 can operate to charge first rechargeable energy source 70 and help slow the vehicle according to principles of regenerative braking. Regenerative braking could replace a Jake brake or compression release brake, which does not recapture energy when braking in one embodiment.

Disengaging first prime mover 20 from transmission 30 further reduces the amount of energy transferred back to first prime mover 20 during braking and reduces the need for engine braking. The control system for the hybrid components may also monitor chassis anti-lock brake system (ABS) activity. If the chassis anti-lock brake system has sensed possible wheel lock-up and has become active, possibly due to low traction or slippery road conditions, then hybrid regenerative braking is suspended by the hybrid control system. The regenerative braking system may be disabled as soon as ABS is active and may remain off for only as long as the ABS is active, or alternatively regenerative braking may remain off for a period of time after ABS is no longer active or regenerative braking may remain off for the remainder of the ignition cycle to eliminate the chance that regenerative braking could adversely affect vehicle handling in low friction, slippery road conditions during the current ignition cycle. At the next ignition cycle, regenerative braking may be reactivated.

Referring to FIG. 1, second rechargeable energy source 90 is utilized. As mentioned above, during vehicle braking, first rechargeable energy source 70 is charged through operation of second prime mover 50. Accessory 60 can operate to further slow the vehicle, and store energy in second rechargeable energy source 90, if second rechargeable energy source 90 is not fully charged. In this manner, regenerative braking can be used to simultaneously charge multiple energy storage devices of system 10. This is intended to allow recharging of both energy storage devices through braking during vehicle travel, among other advantages. A clutch (e.g., clutch 22) can be optionally included between first prime mover 20 and transmission 30 to further improve regenerative braking.

In one embodiment, during operation of equipment 100, component 40 is not coupled to second prime mover 50 and accessory 60 can optionally directly power equipment 100. An optional APU 80 can charge first rechargeable energy source 70 and/or second rechargeable energy source 90 as required.

According to another exemplary embodiment, system 10 may be an idle reduction system. An idle reduction system may have a configuration similar to any previously described embodiment of system 10 but is not configured to provide power back to first prime mover 20 and drive shaft 32 (e.g., the drive train). Instead, interface 41 only provides power in one direction (e.g., interface 41 does not back-drive into transmission 30). Such a system 10 does not require additional software, calibration and control electronics that is required for the integration of a hybrid drive system. Such a system 10 may also not require sophisticated thermal management systems and higher capacity motors and drive electronics. Such a system 10 may include an optional secondary rechargeable power source 90 such as an accumulator and/or an optional APU 80 or may even include a connection to a power grid. If system 10 does not include a second rechargeable power source 90 such as an accumulator, system 10 may include air, wireless or fiber optic controls. If system 10 includes a second rechargeable power source 90, no additional control system is required (e.g., the accumulator forms a closed centered hydraulic system with hydraulic controls).

As an example, in one idle reduction configuration with reference to FIG. 4, a PTO with an integrated clutch component 41 is connected to a transmission 30 and is coupled to a hydraulic motor (e.g., accessory 60). When the batteries reach a low state of charge, or the electric motor speed slows below an acceptable level due to low battery energy, the prime mover (usually a diesel or gas engine) is started. The engine rpm is adjusted so that the PTO shaft will provide the needed rotational speed for the hydraulic pump. PTO is then engaged and drives the hydraulic pump.

The batteries can be charged through the electric motor, or through a vehicle alternator, or alternatively the batteries may remain depleted at the job-site and recharged once the vehicle returns to a location in which power from the grid can be used to recharge the batteries. If batteries remain depleted, the engine is started, PTO is engaged and hydraulic pump or other auxiliary equipment often used on a work truck at a job-site is mechanically powered by the first prime mover (ICE) or mover 20 through interface 41.

The location to charge the vehicle may be a garage with a charging station or an ordinary plug. Using only grid power to recharge the batteries can simplify the idle reduction system. A separate vehicle monitoring system may record if the batteries are recharged at a garage overnight, or if the batteries need to be serviced or replaced. Such a system may send a signal via a link (such as cellular, satellite, or wireless local area network, or a wired connection) to a fleet management system so that fleet personnel can take action to maintain system or train vehicle operators.

The battery system may be designed to be modular and easy for replacement battery modules to be installed. A modular, replaceable battery system can allow a vehicle to use a lower cost battery initially that has a shorter useful life and then replace it when the existing battery no longer can store sufficient energy, with the same type of battery, or a more advanced battery. A replaceable battery system may be beneficial since lower cost batteries can be used until more advanced batteries capable of more energy storage, lower mass and greater service life are available at lower costs. The battery system may have electronics integrated in a module and may include thermal management. The electronics may produce uniform input and output electrical characteristics, allowing for different battery technologies to be used, without affecting idle reduction performance. The battery may also be designed for quick replacement. Such a design could make it possible to use batteries that are charged at a base station. Batteries at a base station may provide power for a facility or to the grid when not needed for a vehicle. There may be additional electronics integrated with the battery module including monitoring circuitry to record power available, power used, how much of the battery life has been reduced (possibly based upon overall percent discharge, rate of discharge and recharge, average operating temperature, frequency of balancing various cells or frequency of achieving full state of charge). Such a system may allow for rental of a battery system or payment based upon battery usage and estimated reduction in battery useful life. This type of modular battery system can also be used on other embodiments of hybrid systems described in this disclosure.

As has been discussed, system 10 may perform many different functions. The function of the various exemplary embodiments of system 10 may change based on the behavior of the vehicle that includes system 10. For example, when the vehicle is braking, regenerative braking may be used to recharge first rechargeable energy source 70 and/or second rechargeable energy source 90. During acceleration, first rechargeable energy source 70 and/or second rechargeable energy source 90 may be used to provide power to the drive train. When the vehicle is parked, on-board equipment 100 such as a hydraulic lift may be activated. Such a hydraulic lift would draw power from second rechargeable energy source 90 (e.g., a hydraulic accumulator) or be driven directly by an accessory 60 such as a hydraulic pump. Once the lift is raised and stops, hydraulic fluid no longer flows. In this position, second rechargeable energy source 90 does not have to be charged and accessory 60 does not have to run to keep the hydraulic lift raised. Therefore, when the lift is not moving, second prime mover 50 may be turned off to reduce unnecessary consumption of energy from first rechargeable energy source 70 and first prime mover 20 may be turned off to reduce unnecessary idling. Prime mover 20 may remain off when the vehicle is parked if there is sufficient energy in rechargeable energy sources for equipment, or "hotel loads", or power that is exported from the vehicle to power tools or lights or other loads. System 10 may include sensors and a control system to automatically turn on and off first prime mover 20, second prime mover 50, accessory 60, or other components of system 10 when they are not needed thereby conserving fuel and reducing emissions.

According to various exemplary embodiments, the elements of system 10 may be coupled together with fluid couplings.

With reference to FIG. 5, vehicle 10 is preferably a construction vehicle such as a construction vehicle including tracks or wheels 33. A separate hydraulic motor 35 can be provided for each wheel 33 or track. Hydraulic motors 35 are powered via accessory 60 embodied as a pump. Optional clutch 52 (FIG. 3) between mover 50 and accessory 60 allows disconnect of electric motor. Clutch 52 (FIG. 3) between prime mover 50 and accessory 60 allows all electric operation. In addition, motors 35 can receive power via second rechargeable energy source 90. Prime mover 20 can power accessory 60 and motors 35 via second prime mover 50. Alternatively, prime mover 50 can operate in an all-electric or hydraulic mode thereby reducing idle times. Idle reduction in construction equipment is particularly advantageous because the vehicle often has to refueled in the field. Accordingly, fuel saving is particularly advantageous. The vehicle associated with system 10 in FIG. 5 can utilize the idle reduction capabilities discussed above with reference to FIGS. 1-4. In addition, motor 50 can be configured to drive electric loads associated with the vehicle embodied as construction equipment. Mover 20 can optionally be coupled to drive accessory 60. A PTO based interface as disclosed in the U.S. patent application Ser. No. 12/130,888 can be utilized as opposed to interface 41.

With reference to FIG. 6, system 10 can be utilized with the vehicle and control systems described in PCT Application No. PCT/US2012/029835. Using the data derived from routes traveled by the vehicle, the structure of vehicle or system 10 can be adjusted for particular routes. For example, motors can be added or removed and batteries can be added or removed to optimize efficiency. For example, the modular battery system associated with first rechargeable energy source 70 can be adjusted based upon historical data on usage to achieve best storage capacity for particular routes, applications, or particular types of jobs. For example, battery modules can be added or subtracted or coupled in series or parallel in response to data. In another embodiment, prime movers (hydraulic or electric) can be added or removed based upon this data. In another embodiment, hybrid system 10 itself can be configured as a series or parallel hybrid system based upon the data. System 10 in FIG. 6 can be a PTO based system as described in U.S. patent application Ser. No. 12/710,247 or PCT Application No. PCT/2012/029835. Monitoring of existing vehicles in the fleet can be used to help determine the optimum energy storage size, especially if the system used one or more modular batteries. The monitoring of existing vehicles allows for the use of model to predict improvements in efficiencies for various hybrid configurations and energy storage sizes. The monitored vehicles would be used as a baseline, and the vehicles with the hybrid systems would be estimated to follow a similar duty cycle once used in the fleet.

FIG. 8 shows a hybrid system 10 capable of operating in modes discussed herein including but not limited to idle bumping and fuel reductions modes. System 10 includes mover 50 and an optional clutch disposed between transmission 30 and prime mover 20. System 10 in FIG. 8 can operate in an all-electric mode based upon operator to input to control system 49. Alternatively, system 10 can automatically operate in the all-electric mode based upon location using a GPS device. For example, when in city limits, system 10 can be automatically placed in an all-electric mode.

Use of second prime mover 50 to reduce or eliminate power required by first prime mover 20 may be enabled without any external input or operator input. Optionally, control system 49 may receive input from external sources or operator input to enable the use of second prime mover 50 to reduce or eliminate fuel consumption from first prime mover 20. Such input may be from a switch activated by the operator to signal that the vehicle should be operated in a mode only using energy from rechargeable energy source 70. Other inputs such as a signal from a fleet management system or other remotely transmitted signal may cause vehicle to operate without consuming fuel. Such a means of operation maybe especially advantageous if the signal is sent in response to declining air quality. System 10 may also monitor the location of the vehicle and activate the mode of reduced or eliminated fuel use if the vehicle is within a certain geographic area, such as the boundary of a city or area determined by a "geo-fence" or virtual perimeter. Time of day may also be factored into the determination of whether to enter into the mode of operation that primarily uses power from second prime mover for propulsion of vehicle. Time of day may be especially advantageous if the mode of operation results in lower noise levels in comparison to vehicle operation using more power from first prime mover. City ordinances or other restrictions may prohibit operation of vehicles if first prime mover is used and produces noise in excess of allowable limits.

A hybrid powertrain configuration shown in FIG. 8 with an accessory mounted to a PTO on transmission 30 (with or without accessory 60 and its associated components shown in FIG. 8) can also be used to operate in a mode in which energy required by first prime mover 20 can be reduced or eliminated while still providing power to accessories that receive power from first prime mover 20. Accessories receiving power from first prime mover 20 may be power steering, HVAC, braking or other components and vehicle sub-systems. The operating mode may be achieved by connecting clutch 47 between second prime mover 50 and first prime mover 20 to effectively couple second prime mover 50 to first prime mover 20. Optional clutch 47 may not be used in other embodiments. Second prime mover 50 is operated preferably using energy from rechargeable energy source 70. Rechargeable energy source 70, as in other configurations of system 10, maybe operated in charge depleting mode or a charge sustaining mode if it stores electrical energy. The charge depleting mode may be especially advantageous if rechargeable energy source 70 is recharged by grid 200. The charge sustain mode may be more advantageous if rechargeable energy source 70 is not recharged by the grid 200. Second prime mover 50 rotates or supplies torque to first prime mover 20 so that first prime mover fuel consumption is reduced as explained above. Second prime mover 50 can also move the vehicle without first prime mover 20 consuming fuel by transmitting torque to both the first prime mover 20 and transmission 30. A first prime mover control system may react to the torque provided by second prime mover 50 by limiting or eliminating fuel use of first prime mover. The first prime mover control system may also react to a signal or detect operating mode so that first prime mover fuel use is limited or eliminated without having to rely upon second prime mover torque or motion (rpm) being applied to first prime mover 20 to provide conditions in which the first prime mover control system causes a reduction or elimination of fuel.

An optional clutch 47 or auto-clutch mounted between first prime mover 20 and second prime mover 50 can be provided in one embodiment. Transmission 30 may have a clutch, or a torque converter or a combination of both in one embodiment. Transmission 30 can also include a PTO coupled to an accessory in one embodiment. Second prime mover 50 may be mounted so that its axis of rotation is approximately on the same axis of rotation as that of the crankshaft or output of first prime mover 20. In such a configuration, it may be necessary to open or disconnect clutch 47 between first prime mover 20 and second prime mover 50 to allow second prime mover 50 to rotate transmission 30 without causing motion of first prime mover 20 and provide power through transmission 30 to a transmission mounted PTO, which may provide power to an accessory. Clutch 47 between first prime mover 20 and second prime mover 50 in FIG. 8 may be required to be larger and relatively more expensive to transmit the maximum torque of first prime mover 20 when compared to the configuration of system 10 described with reference to FIG. 2. Clutch 47 and second prime mover 50 may also be subject to more vibration due to coaxial alignment with first prime mover 20 than clutch 42 and second prime mover 50 shown in the configuration of system 10 in FIG. 2 or other configurations in which second prime mover 50 is not concentric with the crank shaft. Concentric location of second prime mover 50 and optional clutches causes limitations in the clearance between components within the clutch and/or second prime mover 50 and/or additional wear to components within clutch and second prime mover 50. Location of second prime mover 50 after the first prime mover 20 mounted concentric with the crank shaft can require additional torque from second prime mover 50 to move components of transmission 30 in order to transmit torque to a transmission mounted PTO and PTO mounted accessory, in comparison to a configuration in which a second prime mover is more directly coupled to an accessory and does not require movement of transmission components to effect motion of the accessory. Additional torque requirements can cause second prime mover 50 to be generally larger, heavier and more expensive than a second prime mover 50 that requires lower torque to move accessory. Rotating transmission 30 to effect motion of the transmission mounted PTO and accessory can also causes losses in efficiency, requiring a larger and more expensive rechargeable energy source.

System 10 may also be configured in as a series hybrid in which two electric motors are used in the propulsion system. The electric motor in a series hybrid system that is directly or indirectly coupled to first prime mover 20 can be used to reduce or eliminate fuel consumption of the first prime mover 20 using the methods described in this patent. Movement of first prime mover 20 in a series system without the use of fuel may be especially advantageous if accessories are coupled directly to the first prime mover 20 and continued operation of those accessories is needed. The accessories may include power steering, HVAC, braking system, pumps or other loads that need to continue to operate when the vehicle is stationary and/or moving. Similarly, system 10 may be configured as a two-mode parallel hybrid that operates automatically as a parallel hybrid or series hybrid.

In some embodiments, the hybrid system 10 of any of FIGS. 1-8 can be utilized in a refuse truck have launch assist and regenerative braking. In some embodiments, control system 49 (e.g., FIG. 7) is configured to provide a balanced mode, where the torque for second prime mover 50 (e.g., the electric motor) in any hybrid system 10 of FIGS. 1-8) is determined based upon driver inputs (such as but not limited to accelerator pedal movement) and sends information to communicate the torque value for the second prime mover 50 to a transmission controller for transmission 30. The transmission controller can be part of control system 49. The transmission controller determines total torque needed to move the vehicle and subtracts out the amount provided by the second prime mover. The transmission controller sends the value of the torque that is calculated by subtracting the electric motor torque from the total required torque to the engine controller which causes the engine to provide torque (e.g., Electric Motor Torque+Engine Torque=Total Required Torque). The balanced mode achieves the benefit of a lower load on first prime mover 20 (e.g., the engine) and lower fuel consumption In some embodiments, control system 49 performs the calculation and sends control signals for the balanced mode to prime mover 20 and second prime mover 50. Advantageously, the balanced mode differs from systems that just add torque in excess of the full torque requested of the engine and provides the benefit if a greater percentage of total required torque being from the electric motor in some embodiments.

In some embodiments, an optional accessory 60 (e.g., a hydraulic pump) may be coupled to the second prime mover 50 (e.g., electric motor). The accessory 60 is a variable volume load sense pump capable of providing high or low or no flow depending upon the need for fluid to power equipment mounted to a truck in some embodiments. The pump may operate a hydraulically powered compactor or crusher (e.g., equipment 100) used to reduce the volume of refuse stored within a truck body. The compressing of the refuse may occur when the vehicle is stationary or during transit, requiring the hydraulic pump to rotate. As an alternate to the variable volume hydraulic pump coupled to the second prime mover 50 (e.g., electric motor), a gear pump is coupled to the electric motor and supplies hydraulic flow when rotated in some embodiments. In order to reduce the force of rotating the gear pump when flow is not needed for equipment 100, a valve controlled by solenoid or other mechanism capable of redirecting hydraulic flow is activated to direct hydraulic flow to a low pressure hydraulic reservoir or tank (e.g., second rechargeable source 90), bypassing the hydraulic circuit needed to move equipment 100 when equipment motion is not needed, resulting in lower friction or power losses when flow is not needed. When the vehicle is in motion and the hydraulic pump provides power to equipment 100 the first prime mover 20, the second prime mover 50 or both can provide power to the hydraulic pump. In some embodiments, the pump is used for rotating a drum of a cement truck or a broom of a street sweeper and uses the balance mode principles described herein.

In some embodiments the second prime mover 50 (e.g., the electric motor) provides power to both the hydraulic pump and the vehicle drive train. The second prime mover may provide power to the drive train through a component 40 (e.g. a PTO) that provides power to transmission 30 which moves the vehicle. During vehicle motion, such as but not limited to vehicle acceleration, the control system 49 subtracts torque that is used to operate the hydraulic pump, so that only torque provided to help the vehicle accelerate is sent to the transmission controller which then increases or decreases the torque required by the prime mover 20 (e.g. the engine) to maintain constant torque input into the transmission 30. The torque needed to rotate the pump may be recorded as a calibration value in the control system 49 (e.g., a hybrid controller or hybrid computer). The value may be measured and stored in the controller. One method of measuring the torque may be accomplished by recording the torque provided by the electric motor to rotate a hydraulic pump without use of the engine. Such a mode of operation may be when a clutch in a PTO is open resulting in low resistance movement of the second prime mover 50. A hybrid controller may then record the torque required to move the hydraulic pump by recording the torque produced by the second prime mover 50 when rotating the pump. The value that is recorded can then be used to approximate the torque that would be required to move the pump when the electric motor also provides power to transmission 30 or drive train. When the vehicle is in motion the equation for torque is as follows: Total torque to the transmission=torque from the first prime mover+output torque from the second prime mover supplied to the drive train. Wherein the output torque from the second prime mover supplied to the drive train is equal to the torque provided by the electric motor– (minus) the torque required to move the pump, when the pump supplies flow to power equipment.

In an embodiment, a PTO is mounted to a transmission, such as a transmission manufactured by Allison Transmission. The PTO may have a clutch. The second prime mover 50 (electric motor) may be connected by a shaft to the PTO. The electric motor may have a second interface providing power to a hydraulic pump. Since the second prime mover can power both the transmission and the hydraulic pump simultaneously, the engine does not have to supply as much power. When not needed, the hydraulic pump can be placed into a low flow mode of operation, or a low resistance mode of operation, or an optional clutch in between the electric motor and the hydraulic pump could be opened.

In some embodiments, the ability to provide selectable torque to the engine and torque to hydraulic system results in lower fuel consumption when an electric motor draws power from a battery system. The battery system may be charged by the grid, regenerative braking or by the engine and the amount of torque from the electric motor may be controlled based upon the amount of power available and the type of power available (e.g., by the grid, regenerative braking or by the engine).

In another embodiment, a hydraulic pump may be powered from vehicle using a front-end power take-off (FEPTO). The first prime mover engine crankshaft is capable of rotating the hydraulic pump using the FEPTO interface. An optional clutch may be placed in between the crankshaft and the hydraulic pump allowing the pump to be disconnected when not needed. Optionally the thydraulic pump can be made to operate with in a lower resistance mode, in which flow is very low or flow moves with lower resistance to a low pressure tank. A FEPTO can sometimes power a pump that operates refuse compacting equipment. In such applications it may be advantageous to measure the torque required to rotate the pump while is does compacting. Such measurement may be through monitoring of torque from the engine when moving the pump when the vehicle is in neutral. The torque that is measured to move the pump can be added to the needed torque from a second prime mover to move a vehicle. By summing the two torques (one needed to move the pump and one needed to assist in propulsion of the vehicle) the electric motor can be controlled to provide consistent power to the transmission even though the FEPTO mounted hydraulic pump is drawing power from the engine. This is especially beneficial if the truck is in motion when the pump is actuated. Such a system provides smoother acceleration even when a pump draws power from an engine.

In some embodiments, control system 49 operates in a route learning mode. Over time the system 49 can learn the specific refuse trucks route distance and average hybrid energy use during route. A default system calibration is initially used and then the system 49 optimizes an increase or decrease in energy provided during certain modes of vehicles propulsion, such as adding more propulsion from the electric motor or using the electric motor to elevate the rpm of the engine at idle for longer periods of time to save the most fuel for certain amount of stored electrical energy. The electrical energy ideally should be allocated to be spent throughout the operation of the vehicle duty cycle so that the battery (e.g., source 70) is at or near depletion before being recharged by the grid. In some embodiments, the control system 49 learns the specific refuse truck route distance and average hybrid energy use during route (starting with basic calibration), and either increase or decrease energy usage multipliers for launch and boosted idle to attempt to make battery system assist through entire route while also using the entire battery system before plugging in.

In some embodiments, it is advantageous to turn off the first prime mover 20 (e.g., engine) when the vehicle is stationary, such as when a truck makes numerous stops to collect refuse. The second prime mover 50 (electric motor) may slow the vehicle down using component 40 (e.g., PTO with the transmission 30) or interface 41. The engine may then be turned off while refuse is collected. The second prime mover 50 may then provide additional power to the engine when the vehicle accelerates to the next refuse collection point or provide 100% of the needed power. The second prime mover 50 may assist the primary engine starter to reduce the stress on the engine starter, which is more likely when the engine stops frequently. Alternatively the second prime mover 50 may provide 100% of the torque needed to restart the engine. If the second prime mover 50 interfaces with the first prime mover 20 through a PTO gear with a clutch between the first prime mover 20 and the second prime mover 50, a separate electric motor can be used to rotate a separate transmission fluid pump in some embodiments. The transmission pump is separate from the engine driven transmission fluid pump internal to the transmission 30 in some embodiments. Moving the electric motor that powers a separate transmission fluid pump adds pressure to a hydraulically activated clutch (e.g., clutch 22, 35 or 42 in FIG. 3)) between the first prime mover 20 and the second prime mover 50 in some embodiments. In some embodiments the clutch maybe internal or near the PTO. Pressurizing the clutch allows the clutch to close and then allows the second prime mover 50 to rotate the first prime mover 20. The clutch can then be opened if the engine stops so that the second prime mover 50 can rotate the hydraulic pump that operates the refuse compacting equipment. The control system 49 can provide control signals to clutch.

In a street sweeper application that utilizes a chassis with a transmission 30 and mover 20, such as a diesel engine, many of the same control techniques can be used as described for the refuse truck application above. In the sweeper application, a hydraulic pumps operate when the vehicle is in motion to power a sweeping mechanism. Without a hybrid system, the engine provides all power for propulsion and for sweeping. It is advantageous to use second prime mover 50 to reduce the load on the prime mover 20 and to save fuel and emissions. While in motion, when the second prime mover 50, which is the electric motor, is providing power to the hydraulic pump, similar to the refuse application when truck mounted equipment 100 needs power to operate during driving, and the battery system (e.g., source 70) is depleted, the electric motor may synchronize with the first prime mover 20 and engage the PTO to the first prime mover 20. The first prime mover 20 can then simultaneously provide power to the hydraulic pump, while also using the electric motor as a generator to recharge the battery system (e.g., source 70).

In some embodiments, it may be desired to provide a surge in power to the hydraulic pump, in which the second prime mover 50 may synchronize with the first prime mover 20, engage the PTO and both movers 20 and 50 may provide power to the hydraulic pump. Such a mode of operation may be controlled by an operator (via user input such as a dashboard button) that desires more power for sweeping or vacuum operations, or may be automatically controlled without user input if a controller determines that the electric motor is not able to provide sufficient power alone to maintain pump rpm.

In some embodiments, a sweeper may pause or stop sweeping if the vehicle exceeds a certain speed. In such situations, control system 49 may monitor speed and provide hydraulic flow to store the sweeper and stop sweeping functions. In other embodiments, the control system 49 may pause use of the sweeper when the vehicle is stationary or at extremely slow speeds below a threshold. In such situations, control system 49 may monitor vehicle speed and command the hydraulic pump, sweeper mechanism or second prime mover to stop. Optionally the sweeper mechanism may be lifted to reduce unnecessary friction on the sweeping brooms and other mechanisms when the vehicle is stationary with the engine on and the vehicle in drive.

In some embodiments, hydraulics are coupled to a rear PTO and the electric motor powers hydraulics (at desired speed) during stationary and non-stationary movements (while driving). In some embodiments when hydraulics are not being commanded, launch assist is enabled where the electric motor provides power to drive the vehicle at starts from a stop.

In some embodiments, hydraulics are operated from a FEPTO. If detected (engine speed is greater than idle speed) to be running a hydraulic movement (compacter, or other), control system 49 boosts engine by putting electric motor power into PTO transmission to assist engine (reducing load/fueling on engine).

In sweeper applications, control system 49 can charge while driving and simultaneously operating hydraulics. Uninterrupted hydraulic work during transitions in and out of field re-charge (sweeping, transport, etc.) can be achieved.

If sweeping and vehicle speed exceeds a calibrated speed limit, control system stop hydraulic work (e.g., stops spinning motor), stores the brooms. If the brake is active and vehicle is not moving for calibrated time, the control system 49 stops hydraulic work (e.g., stop spinning motor).

In other embodiments, the second prime mover 50 rotates the first prime mover 20 at a higher rpm than the idle set speed, reducing fuel consumption when the vehicle is stationary, without stopping the engine. Continuing to rotate the engine with much lower fuel consumption or no fuel consumption may be beneficial if the engine (first prime mover) experiences excessive wear and tear during engine stops because bearings and other surfaces that move frequently stop getting lubricated when the engine stops. The frequent starting and stopping of the motion of the engine may also disrupt emission control sensors and counters, masking failures from proper detection, such as if counters are cleared when the engine stops moving. Continuing to move the engine with low or no fuel consumption allows the engine to continue to receive lubrication from the engine drive oil pump and continues to provide power for brakes and other important functions. In some embodiments, control system 49 or other controller delays the operation of the hydraulic pump for compressing refuse until the vehicle is at a speed that requires less torque from the second prime mover 50, such as when lower acceleration or constant speed is attained. The benefit of waiting to operate the hydraulic pump includes more available torque from the second prime mover 50 for the powertrain. Similar advantages can be achieved in street sweeper and cement mixing applications.

It is also important to note that the arrangement of the hybrid drive system components, as shown, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited herein. For example, although gear types, and optional clutches are discussed, the system can use various components without departing from the scope of the invention unless specifically recited in the claims. Accordingly, all such modifications are intended to be included within the scope of the present disclosure as described herein. The use of the terms shaft or through shaft are used to describe a means to transfer torque and may include couplers, such as but not limited to Lovejoy couplers, flexible couplings, or joints, such as but not limited to U-joints or constant velocity joints, and may be referred to as thru-drive in some applications. The order or sequence of any process or method steps may be varied or re-sequenced according to alternative embodiments. Other substitutions, modifications, changes, and/or omissions may be made in the design, operating conditions and arrangement of the preferred and other exemplary embodiments without departing from the exemplary embodiments of the present disclosure as expressed herein.

What is claimed is:

1. A vehicle drive system for a vehicle comprising a first prime mover, a power take off and a first prime mover driven transmission in mechanical communication with the power take off, the vehicle drive system comprising:
    an electric motor in direct or indirect mechanical communication with the first prime mover via the power take off; and
    a control system configured to cause the electric motor to rotate the first prime mover via the power take off, wherein the control system operates on a balanced mode where the control system determines a torque for the electric motor based upon driver inputs, determines total torque needed to move the vehicle, and subtracts out an amount provided by the electric motor to obtain a first prime mover torque, wherein the control system causes the first prime mover to provide prime mover torque, wherein a flow of transmission fluid is provided while the first prime mover is not consuming fuel and the vehicle is stationary, wherein the transmission fluid is provided by a transmission fluid pump through the power-take-off via operation of the first prime mover powered by the power take off driven by the electric motor, and wherein the flow of the transmission fluid through the power-take-off is increased by an additional pump when the electric motor rotates.

2. The vehicle drive system of claim 1, wherein the control system determines the amount provided by the electric motor using an amount the electric motor provides equipment.

3. The vehicle drive system of claim 2, wherein the equipment is a compactor, sweeper, or mixing drum.

4. The vehicle drive system of claim 3, wherein the equipment is driven by a hydraulic pump driven by the electric motor.

5. The vehicle drive system of claim 4, wherein the power take off comprises a clutch coupled to the transmission.

6. The vehicle drive system of claim 3, wherein the equipment is driven by a hydraulic pump driven by the electric motor, the electric motor being directly coupled to the hydraulic pump by a shaft.

7. The vehicle drive system of claim 6, wherein the hydraulic pump is a load sense pump.

8. The vehicle drive system of claim 6, wherein the hydraulic pump is a gear pump and a valve is disposed to redirect hydraulic flow when the equipment is not operated.

9. The vehicle drive system of claim 6, wherein the equipment is the compactor.

10. The vehicle drive system of claim 6, wherein the equipment is a street sweeper.

11. The vehicle drive system of claim 1, wherein the control system uses feedback from an accessory to set a speed while the vehicle is stopped, thereby reducing fuel consumption at idle for the vehicle and the accessory is an air conditioning system.

12. A method of operating a vehicle having a hybrid vehicle drive system, the vehicle includes a first prime mover, and a prime mover driven transmission, the method comprising:
    eliminating fuel flow to the first prime mover;
    operating an electric motor directly or indirectly coupled to the first prime mover via a power-take-off;
    providing a flow of transmission fluid while the first prime mover is not consuming fuel and the vehicle is stationary, wherein the transmission fluid is provided through the power-take-off via operation of the first prime mover powered by the electric motor;
    providing additional flow of the transmission fluid through the power-take-off using an additional pump when the electric motor rotates; and
    communicating with a transmission controller and/or engine controller to cause, enable or command the starting and stopping of the first prime mover.

13. The method of claim 12, wherein the stopping of the first prime mover is done at a cylinder or crankshaft position such that the first prime mover is started to more easily after the first prime mover has stopped.

14. The method of claim 12, wherein movement is initiated only using energy from a rechargeable energy source using the electric motor and combustion is initiated within the first prime mover after the movement.

15. The method of claim 14, wherein the combustion is initiated at a later time to transition to a blended mode of propulsion using both the electric motor and the first prime mover.

16. A vehicle drive system for a vehicle including a first prime mover, a first prime mover driven transmission, and a rechargeable power source, the vehicle drive system comprising:

an electric motor in direct or indirect mechanical communication with the first prime mover via a power-take-off, wherein the electric motor is configured to provide power to the first prime mover; and a control system configured to cause the electric motor to act as a generator to put increased load on the first prime mover to increase exhaust temperature when exhaust temperatures are too low during a cold start, wherein the control system configured to cause the electric motor to rotate the first prime mover, wherein a flow of transmission fluid is provided while the first prime mover is not consuming fuel and the vehicle is stationary, wherein the transmission fluid is provided by a transmission fluid pump through the power-take-off via operation of the first prime mover powered by the power take off driven by the electric motor, and wherein the flow of the transmission fluid through the power-take-off is increased by an additional pump when the electric motor rotates.

17. The vehicle drive system of claim 16, wherein the control system uses feedback from an accessory to set a speed while the vehicle is stopped, thereby reducing fuel consumption at idle for the vehicle and the accessory is an air conditioning system.

18. The vehicle drive system of claim 17, wherein the speed is below 1000 RPMS and above 540 RPMs.

19. A vehicle drive system for a vehicle including a first prime mover, a first prime mover driven transmission, and a rechargeable power source, the vehicle drive system comprising:

an electric motor in direct or indirect mechanical communication with the first prime mover via a power-take-off wherein the electric motor is configured to provide power to the first prime mover; and a control system configured to cause the electric motor to rotate the first prime mover at a speed during a start, wherein the electric motor is used to start the first prime mover and the first prime mover immediately begins consuming fuel during the start, wherein the control system is configured to cause the electric motor to rotate the first prime mover, wherein a flow of transmission fluid is provided while the first prime mover is not consuming fuel and the vehicle is stationary, wherein the transmission fluid is provided through the power-take-off via operation of the power take off, wherein the transmission fluid is provided by a transmission fluid pump through the power-take-off via operation of the first prime mover powered by the power take off driven by the electric motor, and wherein the flow of the transmission fluid through the power-take-off is increased by an additional pump when the electric motor rotates.

20. The vehicle drive system of claim 19, wherein the control system causes the electric motor to act as a generator to put increased load on the first prime mover to increase exhaust temperature when exhaust temperatures are too low.

\* \* \* \* \*